(12) United States Patent
Adachi et al.

(10) Patent No.: US 7,838,164 B2
(45) Date of Patent: Nov. 23, 2010

(54) FILM ELECTRODE COMPOSITE ELEMENT AND PRODUCTION METHOD THEREFOR, AND FUEL CELL

(75) Inventors: Shinya Adachi, Shiga (JP); Daisuke Izuhara, Kyoto (JP); Masataka Nakamura, Shiga (JP); Naoki Shimoyama, Shiga (JP); Takao Uete, Shiga (JP); Masayuki Kidai, Shiga (JP)

(73) Assignee: Toray Industries, Inc., Tokyo (JP)

( * ) Notice: Subject to any disclaimer, the term of this patent is extended or adjusted under 35 U.S.C. 154(b) by 159 days.

(21) Appl. No.: 11/721,143

(22) PCT Filed: Nov. 24, 2005

(86) PCT No.: PCT/JP2005/021507

§ 371 (c)(1),
(2), (4) Date: Sep. 24, 2009

(87) PCT Pub. No.: WO2006/061993

PCT Pub. Date: Jun. 15, 2006

(65) Prior Publication Data

US 2010/0015493 A1    Jan. 21, 2010

(30) Foreign Application Priority Data

Dec. 7, 2004   (JP)   .............................. 2004-353914
Sep. 1, 2005   (JP)   .............................. 2005-253178

(51) Int. Cl.
*H01M 8/10*   (2006.01)
*H01M 4/86*   (2006.01)

(52) U.S. Cl. ........................ 429/483; 429/530; 429/535

(58) Field of Classification Search .................. 429/30, 429/32, 33, 42, 483, 530, 535; 427/115; 501/101

See application file for complete search history.

(56) References Cited

U.S. PATENT DOCUMENTS 5,403,675 A   4/1995   Ogata et al.

(Continued)

FOREIGN PATENT DOCUMENTS

FR   2 810 794 A1   12/2001

(Continued)

OTHER PUBLICATIONS

Ticianelli et al., "Methods to Advance Technology of Proton Exchange Membrane Fuel Cells", J Electrochemical Science, Electrochemistry, 53, 269 (1958).

(Continued)

*Primary Examiner*—Stephen J. Kalafut
(74) *Attorney, Agent, or Firm*—Pillsbury Winthrop Shaw Pittman LLP

(57) ABSTRACT

It is an object of the present invention to provide a method of producing a membrane electrode assembly using an interface resistance reducing composition which can simply reduce the resistance of the interface between an electrode and an electrolyte membrane in a short time at low temperatures at low pressure without polimerization while maintaining an effect of suppressing a fuel crossover even with an electrolyte membrane having high heat resistance, high strength, a high tensile elastic modulus and a low water content. This is achieved by a method of producing a membrane electrode assembly formed by sandwiching an electrolyte membrane between a pair of electrodes, comprising the steps of bonding at least one electrode to the electrolyte membrane sandwiching an interface resistance reducing composition containing a plasticizer between the electrode and the electrolyte membrane, and a membrane electrode assembly formed by sandwiching an electrolyte membrane between a pair of electrodes, wherein the membrane electrode assembly has a layer (A) at least between one electrode and the electrolyte membrane, and the value of the storage modulus C is 1 GPA or more when the storage moduli of the electrolyte membrane and the layer (A), which are measured with an ultramicro penetrometer, are regarded as C and D, respectively.

15 Claims, 4 Drawing Sheets

U.S. PATENT DOCUMENTS

| | | | |
|---|---|---|---|
| 2002/0091225 A1 | | 7/2002 | McGrath et al. |
| 2002/0155340 A1* | | 10/2002 | Nanaumi et al. .......... 429/42 X |
| 2003/0215682 A1* | | 11/2003 | Takashita et al. ............. 429/23 |
| 2005/0112448 A1* | | 5/2005 | Nakamura et al. ............ 429/42 |
| 2005/0181285 A1* | | 8/2005 | Sakamoto et al. ........... 429/304 |
| 2006/0251951 A1* | | 11/2006 | Obata et al. .................. 429/42 |

FOREIGN PATENT DOCUMENTS

| | | | |
|---|---|---|---|
| JP | 59-209278 | | 11/1984 |
| JP | 2-305881 | | 12/1990 |
| JP | 4-132168 | | 5/1992 |
| JP | 4-255776 | | 9/1992 |
| JP | 9-223503 | | 8/1997 |
| JP | 2001-110428 | | 4/2001 |
| JP | 2004-006306 | | 1/2004 |
| JP | 2004-185930 | * | 7/2004 |
| JP | 2004185930 A | | 7/2004 |
| JP | 2005-129295 | | 5/2005 |
| JP | 2004-224953 | * | 8/2009 |
| WO | 2004051776 A1 | | 6/2004 |
| WO | 2004091027 A1 | | 10/2004 |

OTHER PUBLICATIONS

Seishiro Murata, "Scanned Probe Microscope for Nanotechnology", edited Science Society of Japan, Maruzen Co., Ltd. (2002).

Sulchek et al., Characterization and optimization of scan speed for tapping-mode atomic force microscopy; Rev. Sci. Instrum., vol. 73, No. 8, pp. 2928-2936 (2002).

Wang et al., "Direct polymerization of sulfonated poly(arylene ether sulfone random (statistical copolymers: candidates for new proton exchange membranes", Journal of Membrahe Science vol. 197, 231-242 (2002).

Yanagimachi et al., Synthesis of Phosphonated poly (4-phenoxybenzoyl-1,4-phenylene) (1), Polymer Preprints, Japan, 51, 750 (2002).

Wang et al., "Synthesis of Sulfonated Poly (Arylene Ether Sulfones)S Via Direct Pyolymerization", Polymer Preprints, Japan, 41(1), 237 (2000).

Takenaka et al., "Studies on Solid Polymer Electrolyte Water Electrolysis II. Preparation Methods for Membrane-Electrocatalyst Composite", Denki Kagaku, 53 (4), 261 (1985).

European Search Report in related application EP05809174 mailed Jan. 26, 2010.

* cited by examiner

FILM ELECTRODE COMPOSITE ELEMENT AND PRODUCTION METHOD THEREFOR, AND FUEL CELL

CROSS REFERENCE TO PRIOR APPLICATION

This application is a U.S. National Phase of International Application No. PCT/JP2005/021507, filed Nov. 24, 2005, which claims priority from Japanese Patent Application No. 2005-253178, filed Sep. 1, 2005 and Japanese Patent Application No. 2004-353914, filed Dec. 7, 2004 the disclosure of which are incorporated herein by reference in their entirety.

TECHNICAL FIELD

The present invention relates to a membrane electrode assembly which can achieve a high output density, a method of producing the same, and a fuel cell using the same.

BACKGROUND ART

A fuel cell is a power generating system having low emission, high energy efficiency, and a low burden on environment. Therefore, in recent years, it is in the limelight again in a growing requirement for environmental protection. The fuel cells are power generating systems which are promising as a relatively small distributed type power generating facilities compared with the conventional large scale power generating facilities and as a power generating equipment for mobile units such as automobiles and marine vessel. Further, the fuel cell receives attention as power sources for small size mobile equipment or for portable equipment, and expected as alternatives a secondary battery such as a nickel-hydrogen battery, lithium-ion battery, and the like, or a battery charger, or to be mounted on a portable equipment such as a cellular phone and personal computer by using in combination with a secondary battery (hybrid)

In a polymer electrolyte fuel cell, in addition to the conventional polymer electrolyte fuel cell (hereinafter, may be referred to as PEFC) in which hydrogen gas is used as a fuel, a direct fuel cell directly supplying a fuel such as methanol also receives attention. Comparing to the conventional PEFC, the direct fuel cell has an advantage that an output is lower than that of conventional fuel cell, but a fuel is liquid and it doe not have a reformer and therefore energy density becomes high, and a running time of portable equipment per one charge becomes long.

In the polymer electrolyte fuel cell generally has a constitution in which electrodes of an anode and a cathode where a reaction supporting power generation occurs, and a polymer electrolyte membrane to be a proton conductor between the anode and the cathode constitutes a membrane electrode assembly (MEA) and a cell formed by sandwiching this MEA between the separator is an unit. Here, the electrode is composed of an electrode base material promoting the diffusion of a gas and collecting (supplying) electric power (also referred to as a gas diffusing electrode or a collector), and a catalyst layer which becomes a field of an electrochemical reaction. For example, in the anode electrode of PEFC, a fuel such as hydrogen reacts in the catalyst layer of the anode electrode and produces a proton and an electron, and the electron is transferred to the electrode base material and the proton is transferred to the polymer electrolyte membrane. Accordingly, the anode electrode is requires to have a good gas diffusing property, a good electron conductivity, and a good proton conductivity. On the other hand, in the cathode electrode, oxidizing gas such as oxygen and air reacts with the proton transferred from the polymer electrolyte membrane and the electron transferred from the electrode base material in the catalyst layer of the cathode electrode and produces water. Accordingly, in the cathode electrode, it is necessary to drain produced water efficiently in addition a good gas diffusing property, a good electron conductivity, and a good proton conductivity.

Further, among PEFC, in the direct fuel cell in which methanol is used as a fuel, different performance from that of the conventional PEFC in which hydrogen gas is used as a fuel is required. That is, in the direct fuel cell, in the anode electrode, a fuel such as an aqueous solution of methanol reacts in the catalyst layer of the anode electrode and produces a proton, an electron and carbon dioxide, and the electron is transferred to the electrode base material, the proton is transferred to the polymer electrolyte membrane, and the carbon dioxide passes through the electrode base material and released out of the system. Therefore, in addition to characteristic requirement of the anode electrode of the conventional PEFC, the permeation of fuel such as an aqueous solution of methanol and a discharging property of carbon dioxide are required. Furthermore, in the cathode electrode of the direct fuel cell, in addition to the same reaction as that in the conventional PEFC, a fuel such as methanol permeated through the electrolyte membrane reacts with an oxidizing gas such as oxygen or air in the catalyst layer of the cathode electrode produces carbon dioxide and water. Accordingly, since produced water increases, it is necessary to drain produced water further efficiently comparing to the conventional PEFC.

Hitherto, perfluoro base proton conducting polymer membranes typified by Nafion (registered trademark, produced by Du Pont Kabushiki Kaisha) have been used as a polymer electrolyte membrane. However, these perfluoro base proton conducting polymer membrane had a problem that in a direct fuel cell, permeation of the fuel such as methanol is large, an output of a battery and energy efficiency are not sufficient. Further, the perfluoro base proton conducting polymer is very expensive since it uses fluorine.

None-perfluoro base proton conducting polymer membrane which is different from the conventional perfluoro base proton conducting polymer membrane, for example, various polymer electrolyte membranes formed by introducing an anionic group into a non-fluorine base aromatic polymer are proposed in U.S. unexamined patent publication 2002/91225, U.S. Pat. No. 5,403,675, and journal of Membrane Science, Vo. 197, 231-242 (2002). However, in these polymer electrolyte membranes, there was a disadvantage that if an amount of anionic ion to be introduced is increased in order to achieve, water tends to be taken in, and a fuel crossover of methanol or the like is large. As an improvement of this defect, a countermeasure that an amount of anionic ion to be introduced is decreased to reduce a fuel crossover is readily conceivable, but in this countermeasure, not only ion conductivity decreases, but also the polymer electrolyte membrane becomes hard when the polymer electrolyte membrane is used as a membrane electrode assembly, and therefore adhesion of the electrolyte membrane to the electrode becomes insufficient, and as a result of this the ion conductivity is reduced and performance of a fuel cell becomes insufficient. That is, when the electrolyte membrane has high heat resistance and high tensile elastic modulus, voids tends to be produced between the fine surface of a catalyst layer and the electrolyte membrane since the membrane is hard and is hardly softened even though it is possible to attain compatibility between a low fuel crossover and a high ion conductivity. Accumulation of bubbles of air or carbon dioxide in the voids also becomes a large resistance to ion conduction and performance of a fuel cell becomes insufficient.

As a countermeasure against these problems, for example, a method of interposing a substance having an ionic group between the electrolyte membrane and the electrode is proposed in Japanese Unexamined Patent Publication No. 59-209278, and Japanese Unexamined Patent Publication No. 4-132168.

In Japanese Unexamined Patent Publication No. 59-209278, a method in which polymer acid in paste form is applied onto the surface of a catalyst layer described in an example of the invention, and olefin electrolyte such as polystyrene sulfonic acid and polyethylene sulfonic acid is used as polymer acid. However, a specific method of forming paste or materials required for forming paste is not disclosed. And, durability of a material used is insufficient.

In Japanese Unexamined Patent Publication No. 4-132168, a method in which a perfluoro base proton conducting polymer is applied to an electrode and dried, and then the electrode and the membrane are unified by hi-temperature press, and monomer composition solution such as sodium polystyrene sulfonate and hexaethylene glycol dimethacrylate, a crosslinking agent, is applied to an electrode, and this electrode is joined with a electrolyte membrane, and joined one is heated and pressurized for 1 hour or more to combine the membrane and the electrode into one sandwiching a crosslinked polymer of the monomer is exemplified.

However, in these methods, since it takes much time to join the electrode and the membrane, or a temperature of about 150° C. is required, the monomer and the solution are unnecessarily permeated into the electrolyte membrane, and the has an adverse effect on the electrolyte membrane's effect of suppressing a fuel crossover and the ionic conductivity, and a fuel cell with high output density cannot be obtained. Further, materials described in these references is insufficient in that durability of adhesive layer between the electrode and the electrolyte membrane is insufficient a fuel cell with high output density cannot be obtained when the material is applied to a direct fuel cell using a fuel such as methanol.

DISCLOSURE OF THE INVENTION

In view of the above state of the art, it is an object of the present invention to provide particularly a method of producing a membrane electrode assembly which can simply reduce the resistance of the interface between an electrode and an electrolyte membrane in a short time at low temperatures at low pressure while maintaining an effect of suppressing a fuel crossover even with an electrolyte membrane having high heat resistance, high strength, a high tensile elastic modulus and a low water content, and further provide a fuel cell with a high output density. Further, it is another object of the present invention to provide particularly a membrane electrode assembly using an electrolyte membrane having high heat resistance, high strength, a high tensile elastic modulus and a low water content, in which an effect of suppressing a fuel crossover is high and a high output density can be drawn out, and further provide a high-power fuel cell using the same.

The present invention for achieving the above-mentioned object adopts the following means. That is, the present invention pertains to a method of producing a membrane electrode assembly formed by sandwiching an electrolyte membrane between a pair of electrodes, comprising the steps of bonding at least one electrode to the electrolyte membrane (hereinafter, bonding an electrode to an electrolyte membrane may be referred to as "combining an electrode and an electrolyte membrane into one" including after bonding an electrode to an electrolyte membrane, unifying bonded ones) sandwiching an interface resistance reducing composition containing a polymer material having an ionic group and a plasticizer between the electrode and the electrolyte membrane, and removing a part of or all of the plasticizer from the foregoing interface resistance reducing composition by extraction by a solvent.

Further, the present invention pertains to a membrane electrode assembly formed by sandwiching an electrolyte membrane between a pair of electrodes, wherein the membrane electrode assembly has a layer (A) at least between one electrode and the electrolyte membrane, and the value of the storage modulus C is 1 GPa or more when the storage modulus of the electrolyte membrane, which is measured with an ultramicro penetrometer, is regarded as C.

Furthermore, the present invention pertains to a membrane electrode assembly formed by sandwiching an electrolyte membrane between a pair of electrodes, wherein the membrane electrode assembly has a layer (A) having a different phase difference, which is measured by scanning on a tapping mode of a scanning probe microscope, from the electrolyte membrane at least between one electrode and the electrolyte membrane, and the electrolyte membrane and the layer (A) contain aromatic hydrocarbon having an anionic group.

Moreover, a fuel cell of the present invention is characterized by employing the membrane electrode assembly.

In addition, in accordance with the present invention, it is possible to reduce the resistance of the interface between the electrode and the electrolyte membrane of a membrane electrode assembly even when an electrolyte membrane having high heat resistance, high strength, a high tensile elastic modulus and a low water content is used, and by employing such a membrane electrode assembly, it becomes possible to provide a fuel cell with a high output. Further, in accordance with the present invention, it is possible to provide a membrane electrode assembly having a low fuel crossover, a high output density and high durability, and by employing such a membrane electrode assembly, it becomes possible to provide a high-power fuel cell.

Figure 1:
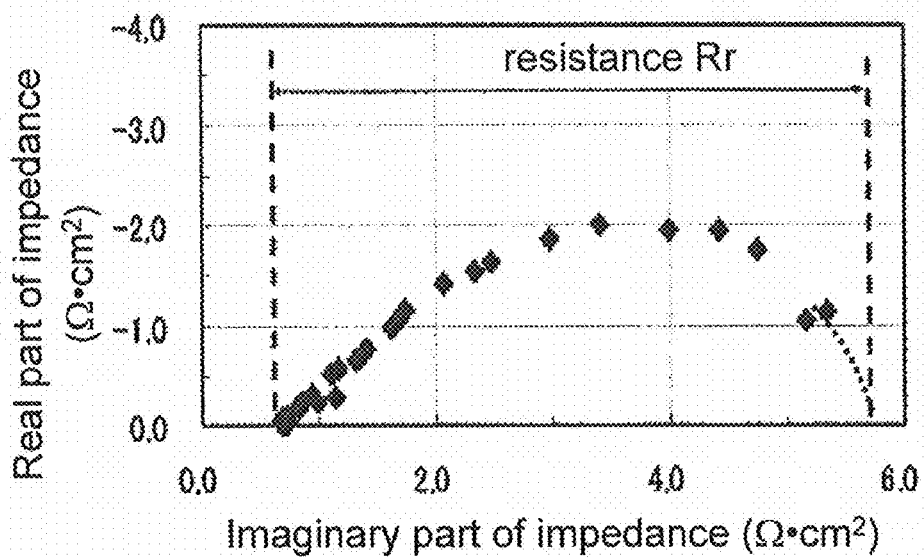
FIG. 1 is a view showing an example of circle fit of the results of impedance measurement of a membrane electrode assembly.

DESCRIPTION OF SYMBOLS 1 membrane electrode assembly
2 gasket
3 bipolar separator
4 current collector
5 fuel feed inlet
6 tightening screw
7 air flow passage
8 fuel flow passage
9 fuel tank
10 electrode
11 electrolyte membrane (layer)
12 layer (A)
13 catalyst layer
14 gasket
15 electrolyte membrane
16 fuel feed inlet and generated gas outlet
17 anode lead
18 collecting mesh
19 catalyst layer+layer (A)
20 fuel diffusion layer
21 fuel holding material
22 cathode lead
23 O ring
24 spacer
25 cathode lead opening (for temperature measurement)
26 air intake
27 housing
28 load
29 connection

BEST MODE FOR CARRYING OUT THE INVENTION

Hereinafter, preferred embodiments of the present invention will be described.

In the method of producing a membrane electrode assembly of the present invention, it is essential to comprise the step of bonding at least one electrode to the electrolyte membrane sandwiching an interface resistance reducing composition containing a plasticizer between the electrode and the electrolyte membrane in a membrane electrode assembly formed by sandwiching an electrolyte membrane between a pair of electrodes.

The present inventors have found out that even if each member of the electrode and electrolyte membrane to be used has excellent properties, if the resistance between the electrode and the electrolyte membrane is large when these members are combined into one, consequently, the performance of the membrane electrode assembly becomes insufficient, and these findings have lead to the present invention. Particularly, for suppressing a fuel crossover of the electrolyte membrane and for improving mechanical strength, such a molecular structure that high heat resistance of 120° C. or higher in glass transition point based on dynamic viscoelasticity, high elastic modulus of 100 MPa or more, preferably 500 MPa or higher, and furthermore preferably 1000 MPa or higher in tensile elastic modulus, high strength, and a low water content of 100% or less with respect to the weight of the electrolyte membrane are attained is preferred, and therefore the electrolyte membrane tends to be stiff. That is, there has been a tendency that even if an excellent electrolyte membrane is found out for improving the performance of a membrane electrode assembly and a fuel cell using the membrane electrode assembly, since the electrolyte membrane is hardly deformed, the foregoing resistance between the electrode and the electrolyte membrane becomes large and expected performance of the membrane electrode assembly cannot be attained.

By sandwiching the interface resistance reducing composition containing a plasticizer between the electrode and the electrolyte membrane in combining the electrode and the electrolyte membrane into one, at least a part of fine voids between the electrode and the electrolyte membrane is filled with the interface resistance reducing composition, and thereby an actual contact area between the electrode and the electrolyte membrane can be increased and an increase in resistance, resulting from the penetration of fuel or air used in a fuel cell and the penetration of water or carbon dioxide produced into the voids, can be prevented. Moreover, the interface resistance reducing composition is permeated into cracks produced in a catalyst layer of the electrode, and thereby it becomes possible to utilize internal walls of cracks in a catalyst layer, which cannot be conventionally used for power generation, and a contact area between the electrolyte and the catalyst can be increased. As the results of these, the resistance of the membrane electrode assembly decreases, the output density becomes high, and a high-performance fuel cell can be attained.

Furthermore, the interface resistance reducing composition can cover the electrode base material or the projections of the catalyst layer, can reduce a micro short circuit in preparing the membrane electrode assembly or a micro short circuit during running as a fuel cell, and therefore can suppress the reduction in the performance of the membrane electrode assembly.

Moreover, even when the electrolyte has pinholes or surface defects, they can be protected and repaired with a layer consisting of the interface resistance reducing composition, and performance of the overall membrane electrode assembly can be stabilized and durability can be improved.

In addition, it is preferred for reducing an interface resistance that 50% or more of an area (projected area) of at least one electrode is combined with the electrolyte membrane sandwiching the interface resistance reducing composition between the electrode and the electrolyte membrane, and the proportion of the combined area is more preferably 75% or more and furthermore preferably 95% or more. Furthermore, 50% or more of each area of a pair of electrodes is combined with the electrolyte membrane sandwiching the interface resistance reducing composition between the electrode and the electrolyte membrane, and the proportion of the combined area is more preferably 75% or more and furthermore preferably 95% or more.

First, the interface resistance reducing composition will be described. As the interface resistance reducing composition of the present invention, the composition satisfying the conditions that the composition has ionic conductivity, it is fluid or plastically deformable at least in combining the electrode with the electrolyte membrane, it does not fill the voids in the electrode excessively to avoid interfering the diffusion of fuel, air, produced water and carbon dioxide, it has good adhesion to the electrolyte membrane, it does not have a detrimental effect on the performance of a catalyst, it is not fluid when it becomes a membrane electrode assembly and at least when power generation is performed, that is, excessive swelling and elution due to a fuel do not occur, for example, when a an aqueous solution of methanol or methanol is used as a fuel, it has methanol resistance and strength which are equal to or higher than the electrolyte membrane to be used is preferred. The present inventors made earnest investigations to satisfy these conditions, and consequently have found that the following compositions are preferred.

First, in order to provide ionic conductivity, it is essential that the interface resistance reducing composition used for the present invention contains the polymer material having an ionic group. As such an ionic group, an atomic group having negative charges is preferred and an atomic group having the ability of proton exchange is preferred. As such a functional group, a sulfonic acid group (—SO$_2$(OH)), a sulfuric acid group (—OSO$_2$(OH)), a sulfonimide group (—SO$_2$NHSO$_2$R (R represents an organic group)), a phosphonic acid group (—PO(OH)$_2$), a phosphoric acid group (—OPO(OH)$_2$), a carboxylic acid group (—CO(OH)), and salts thereof can be preferably adopted. The foregoing polymer material can contain two or more species of these ionic groups, and the polymer material may become more preferable by the combination of these ionic groups. This combination is appropriately determined depending on a structure of a polymer or the like. Among others, it is more preferred to have at least any one of a sulfonic acid group, a sulfonimide group, and a sulfuric acid group from the viewpoint of high proton conductivity, and it is most preferred to have at least the sulfonic acid group from the viewpoint of hydrolysis resistance. When the polymer material has the sulfonic acid group, the density of the sulfonic acid group is preferably 0.1 to 5.0 mmol/g from the viewpoint of proton conductivity and the viewpoint of suppressing a fuel crossover, more preferably 0.5 to 3.5 mmol/g, and furthermore preferably 1.0 to 3.5 mmol/g. By setting the density of the sulfonic acid group to 0.1 mmol/g or more, the ionic conductivity or low interface resistance can be maintained, and by setting the density to 5.0 mmol/g or less, it is possible to prevent an interface resistance reducing layer from excessively swelling to be eluted or outflow due to a fuel for example when the interface resistance reducing composition is used in a fuel cell such as a direct methanol fuel cell in which it comes into contact directly with a liquid fuel.

Herein, a density of a sulfonic acid group refers to a molar quantity of a sulfonic acid group introduced per unit dry weight of the polymer material, and a higher value of the density indicates that a degree of sulfonation is high. The density of the sulfonic acid group of a polymer material to be used can be measured by elementary analysis, neutralization titration or nuclear magnetic resonance spectrum analysis. It is preferred to use elementary analysis from the viewpoint of ease of measurement of the density of a sulfonic acid group and measurement accuracy, and this method is generally employed. However, when it is difficult to determine the exact density of a sulfonic acid group by elementary analysis as in the case of containing sulfur source besides the sulfonic acid group, a neutralization titration method is employed. Further, when it is difficult to determine the density of a sulfonic acid group even by these methods, a nuclear magnetic resonance spectrometry can be employed.

As specific examples of the polymer material having an ionic group, polymer electrolyte materials having an aromatic ring on the main chain are preferred from the viewpoint of mechanical strength, fuel resistance, and heat resistance of the interface resistance reducing layer, and examples of the polymer material having an ionic group include aromatic hydrocarbon polymers having an ionic group such as ionic group-containing poly(phenylene oxide), ionic group-containing polyetherketone, ionic group-containing polyetheretherketone, ionic group-containing polyether sulfone, ionic group-containing polyetherethersulfone, ionic group-containing polyether-phosphineoxide, ionic group-containing polyetherether phosphineoxide, ionic group-containing poly(phenylene sulfide), ionic group-containing polyamide, ionic group-containing polyimide, ionic group-containing polyether imide, ionic group-containing polyimidazole, ionic group-containing polyoxazole and ionic group-containing polyphenylene. Of these polymer materials having an ionic group, ionic group-containing polyetherketone and ionic group-containing polyetheretherketone are suitably used from the viewpoint of ease of the control of introduction rate of an ionic group and from the viewpoint of fuel resistance when an aqueous solution of methanol is used as a fuel. Here, the conditions on the ionic group are as stated previously.

A method of introducing the ionic group into these polymer materials may be a method of introducing the ionic group into a polymer or a method of polymerizing a monomer containing the ionic group. The introduction of a phosphonic acid group into a polymer can be implemented according to, for example, a method described in "Polymer Preprints, Japan", 51, 750 (2002). The introduction of a phosphoric acid group into a polymer can be implemented, for example, by phosphoric esterification of a polymer containing a hydroxyl group. The introduction of a carboxylic acid group into a polymer can be implemented, for example, by oxidizing a polymer containing an alkyl group or a hydroxyl group. The introduction of a sulfonimide group into a polymer can be implemented, for example, by treating a polymer containing a sulfonic acid group with alkylsulfonamide. The introduction of a sulfuric acid group into a polymer can be implemented, for example, by sulfate esterification of a polymer containing a hydroxyl group. The introduction of a sulfonic acid group into a polymer can be implemented, for example, by reacting a polymer with chlorosulfonic acid, oil of vitriol, or fuming sulfuric acid. These methods, of introducing an ionic group can be controlled so as to have an aimed density of an ionic group by appropriately selecting a treating time, a concentration and temperature.

In addition, the polymerization of a monomer containing the ionic group can be implemented according to, for example, a method described in "Polymer Preprints", 41 (1), 237 (2000). When a polymer is obtained according to this method, a degree of the introduction of the ionic group can be readily controlled by adjusting a mixing ratio of the monomer containing the ionic group.

Further, when the polymer material having an ionic group to be used has a non-crosslinked structure, a weight average molecular weight is preferably 10000 to 5000000, and more preferably 30000 to 1000000. By limiting the weight average molecular weight to 10000 or more, it is possible to attain mechanical strength suitable for practical use as a low interface resistance layer. On the other hand, by limiting the weight average molecular weight to 5000000 or less, an interface resistance reducing composition easy to handle can be obtained, and good processability can be maintained. The weight average molecular weight can be measured by a GPC method.

Furthermore, the interface resistance reducing composition used in the present invention needs to contain a plasticizer. As the plasticizer, a substance satisfying the conditions for the interface resistance reducing composition described above is selected. The reason why the interface resistance reducing composition needs to contain the plasticizer is that this enables the interface resistance reducing composition to fluidize below a decomposition temperature of the above-mentioned polymer material having an ionic group and in a temperature range in which adverse effects such as decomposition and deformation of a material to be used do not occur. When the interface resistance reducing composition does not contain the plasticizer, it is necessary to raise temperature to or above a softening point of the above polymer electrolyte and this has adversely affect another materials used. Accordingly, the performance of the membrane electrode assembly may become insufficient.

The plasticizers referred to in the present invention means a material which is in the foregoing polymer material having an ionic group and enables the polymer material to soften at lower temperature than the inherent softening point of the polymer material. That is, it means a material which facilitates processing such as molding, film forming, and coating. Further, the plasticizer may be liquid, solid, or vapor at room temperature as long as it satisfies the foregoing conditions on the interface resistance reducing composition, however, generally, liquid and solid are preferred. In addition, the plasticizer can be used regardless of it properties and forms, that is, in the form of polymer, oligomer, paste, sol, oil, or emulsion, and it may be just only mixed with polymer material having an ionic group, or may be partially reacted with the polymer material having an ionic group to be bonded to or be strongly adsorbed on the polymer material.

Specific examples of the above-mentioned plasticizers include a wide variety of plasticizers such as isobonyl acrylate, 4-hydroxybutyl acrylate, acryloyl morpholine, 12-aminododecanoic acid, allyl glycol, alkylphenol, aluminum chelate, isophthalic acid, isophthalic diallyl, isopropylacrylamide, p-isopropenylphenol derivatives, itaconic acid, iminodiacetic acid, indene, ethylcellulose, ethyleneimine, n-octyl alcohol, xylenol, glycidyl ethers, crotonic acid, 2-chloroethylvinylether, p-chlorostyrene and derivatives thereof, sodium 2-diazo-1-naphthol-5-sulfonate, cyanoacetic ester, diaminodiphenyl ether, N,N-diethylacrylamide, diethyleneglycolbis(allyl carbonate), N,N-diglycidyl-o-toluidine, 1,4-cyclohexanedimethanol, dicyclopentadiene, dihydroxydiphenylmethane, 4,4'-dihydroxybiphenyl, diphenylmethane diisocyanate, dipropylene glycol, dipentaerythritol hexa(penta)acrylate, N,N-dimethylacrylamide, N,N-dimethylformamide, hydrogenated bisphenol A, shellac, diacetone acrylamide, dimerdiol, thioglycerol, tetracyanoquinodimethane, terpene diphenol, diallyl terephthalate, dodecanedioate, triglycol dimercaptane, o-tolidine, o-tolidine diisocyanate, tris(epoxypropyl)isocyanurate, tris(2-hydroxyethyl)isocyanurate, trimethylolethane, trimethylolpropane, trimethylolpropane triglycidyl ether, 2,6-naphthalenedicarboxylic acid dimethyl, naphthylene-1,5-diisocyanate, neopentyl glycol, norbornane diisocyanate, parahydroxybiphenylcarboxylic acid, bisacid A2, 1,3-bis(aminomethyl)cyclohexane, bis[4-(1-hydroxyethoxy)phenyl]sulfone, 2-hydroxyethyl acrylate, 2-hydroxyethyl methacrylate, 2-hydroxypropyl acrylate, N-vinylacetamide, sodium vinyl sulfonare, vinyl toluene, 2-vinylpyridine, 4-vinylpyridine, N-vinyl formamide, vinyl pivalate, biphenol, phenylphosphonic acid and derivatives thereof, N-Phenylmaleimide, 1,3-butanediol, 1,2,3,4-butanetetra carboxylic acid, butyl hemiformal, n-butyl methacrylate, fumaric acid, furfural, furfuryl alcohol, 1,6-hexanediol, benzoguanamine, pentaerithritol, polycarbonatediol, polytetramethylene ether glycol, 1,2-poly (butadiene), itaconic anhydride, endo methylenetetrahydrophthalic anhydride, tetrahydrophthalic anhydride, pyromelletic dianhydride, metaxylylenediamine, glycidyl methacrylate, cyclohexyl methacrylate, benzyl methacrylate, α-methylstyrene, 3-methyl-1,5-pentanediol, α-methylstyrene dimmer, methyl acetyl ricinoleate, azelaic acid, isodecyl alcohol, octyl diphenyl phosphate, phosphoric acid diphenyl cresyl, di-2-ethylhexyl azelate, sebacic acid, dioctyl sebacate, dibutyl sebacate, triphenyl phosphate, 2,2,4-trimethyl-1,3-pentanediol diisobutyrate, n-nonyl alcohol, 1,2-butanediol, 1,5-pentanediol, trimellitic anhydride, tricresylphosphate, RHEOPHOS, p-ethylphenol, n-octadecyl-3-(3',5-di-tert-butyl-4-hydroxyphenyl)propionat e, distearyl pentaerythritol diphosphite, diphenyl isooctyl phosphate, diphenyl isodecyl phosphate, dimyristyl-3,3'-thiodipropionate, thiodipropionic acid, tetrakis[methylene-3(3',5'-di-t-butyl-4'-hydroxyphenyl)prop ionate]methane, tris(3,5-di-t-butyl-4-hydroxybenzyl)isocyanurate, tris(2,4-di-t-butylphenyl)phosphite, 1,1,3-tris(2-methyl-4-hydroxy-5-t-butylphenyl)butane, triphenyl phosphite, 4,4'-butylidene-bis(3-methyl-6-tert-butylphenol), ethyl 2-cyano-3,3-diphenylacrylate, 2-(3,5-di-t-butyl-2-hydroxyphenyl)-5-chlorobenzotriazole, TINUVIN 318, TINUVIN 622LD, bis(2,2,6,6-tetramethyl-4-piperidine)sebacate, 2-hydroxy-4-n-octoxy benzophenone, 2(2'-hydroxy-3'-t-butyl-5'-methylphenyl)-5-chlorobenzotriazole, 2(2'-hydroxy-5'-methylphenyl)-5-chlorobenzotriazole, 2-hydroxy-4-n-methoxybenzophenone, benzophenone, antimony trioxide, diethyl-n,n-bis(1-hydroxyethyl)aminomethylphosphonate, cyclododecatriene, dibromocresyl glycidyl ether, guanidine sulfamate, decabromodiphenylether, dechlorane plus, tetrabromobisphenol A, tris(b-chloroethyl)phosphate, tris(2,3-dibromopropyl)isocyanurate, 2,4,6-tribromophenol, 1,2-bis(2, 4,6-tribromophenoxy)ethane, hexabromocyclododecane, hexabromobenzene, azodicarbonamide, 1-aminoethylpiperazine, β-aminocrotonic ester, allyl methacrylate, alkenyl succinic anhydride, imidazoles, urotropin, ethylene bis stearoamide, erucamide, n-octyl mercaptan, oleamide, peracetic acid, m-xylylenediamine, 1,8-diaza-bicyclo(5,4,0)undecene-7, 1,5-diaza-bicyclo(4,3,0)nonene-5,4,4'-diamino-3, 3'-diethyldiphenylmethane, 3,3'-diaminodiphenyl sulfone, 4,4'-diaminodiphenyl sulfone, di(2-ethylhexyl)peroxydicarbonate, dicumyl peroxide, N,N-di(glycidyl)aniline, dichlorodiaminodiphenylmethane, N,N-dintropentamethylenetetramine, 9,10-dihydro-9-oxa-10-phosphaphenanthrene-10-oxide, divinylbenzene, diphenyl disulfide, 2-di-n-butylamino-4,6-dimercapto-s-triazine, dibenzylidenesorbitol, 3,3'-dimethyl-4,4'-diaminodiphenylmethane, dimethyl thiotoluene diamine, stearamide, aluminium stearate, spiroacetal compounds, sorbitol polyglycidyl ether, dimer acid, ultrafine silica anhydride, t-dodecyl mercaptan, n-dodecyl mercaptan, triallyl isocyanurate, triethylamine, 2,4,6-tri(dimethylaminomethyl)phenol, tripropylene glycol diacrylate, α,α,α-tribromomethylphenylsulfone, trimethallyl isocyanurate, 2,2,4-trimethyl-1,3-pentanediol monoisobutyrate, trimethylolpropane trimethacrylate, norbornane diamine, bis(dithiobenzyl) nickel, 2,2-bis(4-hydroxyphenyl)-hexafluoropropane, bis[2-methyl-4-(3-n-alkylthio propionyloxy)-5-t-butylphenyl]sulfide, 2-(2'-hydroxy-5'-methacryloxyethylphenyl-2H-benzotriazole, pivalic acid, phenolalalkyl resins, phenothiazine, p-tert-butylbenzoic acid, 4-t-butylcatechol, t-butyl peroxybenzoate, N-(n-butoxymethyl)acrylamide, hexamethylene diisocyanate, benzyl, 1-benzyl-2-ethylimidazole, p-benzoquinone, aluminumborate whisker, chlorendic anhydride, chlorendic acid, hexahydrophthalic anhydride, methylendo methylenetetrahydrophthalic anhydride, methyl ethyl ketoxime, N,N-methylenebisacrylamide, methylene bis (stearamide), N-methylolacrylamide, 2-mercaptoethanol, β-mercaptopropionic acid, Vinyl monochloroacetate, liquid paraffin; and nonprotonic polar solvents such as N,N-dimethylacetamide, N,N-dimethylformamide, N-methyl-2-pyrrolidone, dimethylsulfoxide, sulfolane, 1,3-dimethyl-2-imidazolidinone and hexa-methylphosphorus triamide; esters such as γ-butyrolactone and butyl acetate; carbonates such as ethylene carbonate and propylene carbonate; alkylene glycol monoalkyl ethers such as ethylene glycol monomethyl ether, ethylene glycol monoethyl ether, propylene glycol monomethyl ether, propylene glycol monoethyl ether, ethylene glycol monobutyl ether and the like; alcohols such as benzyl alcohol and isopropanol; polyhydric alcohols such as ethylene glycol, propylene glycol, 1,4-butanediol, 1,6-hexanediol, trimethyleneglycol, neopentyl glycol, cyclohexane dimethanol, glycerin, diethylene glycol, pentaerithritol, polyethylene glycol, polypropylene glycol and polytetramethylene glycol; acetic acid, phosphoric acid, sulfuric acid, trioctyl phthalate, trioctyl phosphate, decane, decalin, water, acetonitrile, isoquinoline, isododecane, isopropyl ether, isophorone, o-chloroaniline, isopropyl acetate, 1,4-diaminoanthraquinone, diisoamyl ether, cyclohexanol, 2-(1-cyclohexenyl)cyclohexanone, dichloroethyl ether, 1,4-dichlorobutane, dibutyl ether, dimethylacetamide, dimethyl sulfoxide, thiodiglycol, tetrahydrofuran, tetrahydrofurfuryl alcohol, triglycol dichloride, ethyl lactate, 2-phenoxyethanol, hexylene glycol, methyl isopropyl ketone, 3-methyl-3-methoxybutanol, methoxybutanol, methoxybutyl acetate, imidazolium salts, pyridinium salts, and quaternary ammonium salts. Among these plasticizers, plasticizers which has the property of forming a hydrogen bond with anionic group of the foregoing aromatic hydrocarbon polymer having an ionic group, in which number of hydrogen bonds can change depending on temperature, that is, a plasticizer capable of imparting the temperature dependency of viscosity of the interface resistance reducing composition is preferred, and furthermore, polyhydric alcohols such as ethylene glycol, propylene glycol, trimethylene glycol, and glycerin are suitably used from the viewpoint of the stability of a coating solution, the workability, cost, and low adverse effect on the catalyst (low catalyst poison).

These plasticizers may be used alone or in combination of two or more species. The plasticizer can be appropriately selected in accordance with the polymer material having an ionic group and the electrode material to be used, and a method and conditions of kneading, Further, a plasticizer with low volatility is preferred from the viewpoint of a coating property, a film forming property, storage stability, and working environment. For example when a boiling point is selected as a measure of volatility, examples of the low volatile plasticizers include a plasticizer having a boiling point of 100° C. or higher, preferably a boiling point of 150° C. or higher, and more preferably a boiling point of 200° C. Moreover, a compound substantially not having a boiling point at atmospheric pressure is further preferred.

Further, as described later, it is preferred from the viewpoint of preventing an effect on an electrode catalyst that a part of or all of the plasticizer is removed at least after bonding the electrode to the electrolyte membrane or providing the plasticizer at the catalyst layer of the electrode, and in this time it is preferred to extract/remove the plasticizer with water or a solvent including water. Therefore, a water-soluble plasticizer is particularly preferred. Among others, low volatile alcohols, which are superior in compatibility with a polymer material having an ionic group having an aromatic ring on the main chain, and can maintain the shape at room temperature, and gives a interface resistance reducing composition having a good hot melting property, are particularly preferred, and polyhydric alcohols are furthermore preferred.

Furthermore, as described later, it is preferred that a part of the plasticizer and the solvent are removed before bonding the electrode to the electrolyte membrane at least after providing the interface resistance reducing composition on the electrode, for example, in the case where a selected plasticizer or solvent is apt to attack the electrolyte membrane, an effect of reducing a fuel crossover is reduced or strength is deteriorated, leading to an adverse effect on durability, and therefore the performance of the membrane electrode assembly is affected, and in this time, it is preferred to extract/remove the plasticizer with water or a solvent including water. When the ionic group of the polymer material having an ionic group in the interface resistance reducing composition is in a state of metal salt, it is industrially preferred since the proton exchanger and the extraction/removal of a part of the compound and the solvent can be simultaneously implemented by adding an acid such as hydrochloric acid or sulfuric acid to an extraction solvent and number of process steps can be reduced. Further, the plasticizer in the interface resistance reducing composition may be mixed with another plasticizer in the extraction solvent to exchange the plasticizer for another plasticizer or to impregnate the interface resistance reducing composition with another plasticizer from the viewpoint of the adhesion to the electrolyte membrane. In addition, the reason why only a part of the plasticizer is removed before bonding the electrode to the electrolyte membrane after providing the interface resistance reducing composition on the electrode is that if the plasticizer does not exist when the electrode is bonded to the electrolyte membrane, the adhesion of the interface resistance reducing composition provided on the electrode to the electrolyte membrane and the follow ability to the projections and recessions of the electrode catalyst are deteriorated, and therefore effects of the present invention of improving durability of the membrane electrode assembly and output of a fuel cell cannot be attained.

As the plasticizer in the present invention, as described above, a plasticizer, which is low volatile in using the interface resistance reducing composition and has good storage stability as an interface resistance reducing composition, is preferred from the viewpoint of the workability and the industrial production. As the plasticizer suitable for the present invention, for example, a plasticizer, which gives an interface resistance reducing composition corresponding to that a weight loss ratio in thermogravity between 100° C. and 300° C. of a sample is 5% or more and 90% or less in a thermogravity weight loss analysis (thermogravimetry (TG)-differential thermal analysis (DTA), temperature raising speed 10° C./min, in $N_2$ atmosphere) of the sample obtained by forming the interface resistance reducing composition into the form of sheet of 100 to 200 μm in thickness and drying the sheet for 1 hour with hot air of 100° C., or that a weight loss ratio through immersion of the sample in any one of hexane, toluene, methanol, and water for 24 hours is 5% or more and 90% or less with respect to the weight before the immersion, is preferred. When the weight loss ratio in these measuring methods is 5% or more, it is possible to secure fluidity and a plastically deforming property in combining the electrolyte membrane and the electrode into one, and therefore a high-performance membrane electrode assembly can be attained. Further, when the weight loss ratio is 90% or less, a probability that the voids in the electrode are filled with the interface resistance reducing composition becomes low, and a high-performance membrane electrode assembly can be attained. Moreover, the storage stability is improved and it is preferred from the economical viewpoint. More preferably, the weight loss ratio is 10% or more and 85% or less, furthermore preferably, 20% or more and 80% or less.

Further, since it is preferred that adhesion is as high as possible from the viewpoint of reducing the interface resistance between the electrolyte membrane and the interface resistance reducing composition, the interface resistance reducing composition may contain a solvent which can dissolve or swell the electrolyte membrane used for the membrane electrode assembly. An amount of this solvent to be contained can be appropriately determined experimentally from the viewpoint of adhesion and an effect on the performance of the electrolyte membrane. By containing the solvent, in some cases, the adhesion between the electrolyte membrane and the interface resistance reducing composition is improved, and a degree of reduction in the ionic conductivity in this interface can be suppressed. On the contrary, when the amount of this solvent is too large, this solution is permeated into the electrolyte membrane and this tends to cause the ability to block a fuel to decrease or to develop a short circuit in the membrane electrode assembly. When this component is contained, it is preferred to be contained in the proportion of 1% by weight or more and 70% by weight or less in the interface resistance reducing composition, and more preferred to be contained in the proportion of 2% by weight or more and 50% by weight or less.

As a method of preparing the interface resistance reducing composition, generally, publicly known methods can be employed, and examples of these methods include a method of charging a polymer material having an ionic group, a solvent thereof and a plasticizer into a proper container and kneading them at a temperature at which stirring can be performed, and a method of charging a polymer material having an ionic group and a plasticizer into an extruder or kneader to melt and knead them. Moreover, in this time, the interface resistance reducing composition may be prepared while being heated.

When the homogeneous interface resistance reducing composition cannot be prepared from only the polymer material having an ionic group and the plasticizer, a method of dissolving the polymer material having an ionic group with a solvent and adding the plasticizer is preferred. In this case, as a solvent to be selected, a solvent which can dissolve the polymer material having an ionic group in such a way that the proportion of the polymer material in the solvent is 10% by weight or more and can be uniformly mixed with the plasticizer is preferred. For example, nonprotonic polar solvents such as N,N-dimethylacetamide, N,N-dimethylformamide, N-methyl-2-pyrrolidone, dimethylsulfoxide, sulfolane, 1,3-dimethyl-2-imidazolidinone and hexa-methylphosphorus triamide; esters such as γ-butyrolactone and butyl acetate; carbonate solvents such as ethylene carbonate and propylene carbonate; alkylene glycol monoalkyl ethers such as ethylene glycol monomethyl ether, ethylene glycol monoethyl ether, propylene glycol monomethyl ether, propylene glycol monoethyl ether and the like; and alcohols such as isopropanol are suitably used.

To the interface resistance reducing composition, a polymer material other than the polymer electrolyte, inorganic materials, or salts may be added in addition to the above-mentioned polymer material having an ionic group and the above-mentioned plasticizer for the purpose of enhancing strength and adhesion of a low interface resistance layer, and fuel resistance, and various inorganic fillers such as montmorillonite and glass fiber, carbon materials such as carbon fiber carbon nanotube, and various particle substances such as silica, alumina, zirconia, titania and polysilsesquioxane may be added as long as it does not have a detrimental effect on the function of interface resistance reducing composition. Specifically, the proportion of the polymer material having an ionic group and the plasticizer in the interface resistance reducing composition is preferably 10% by weight or more, more preferably 30% by weight or more, and further preferably 40% by weight or more.

A method of sandwiching the interface resistance reducing composition of the present invention between the electrode and the electrolyte membrane is not particularly limited. For example, by providing the interface resistance reducing composition on the electrolyte membrane and then bonding the electrolyte membrane provided with the interface resistance reducing composition to the electrode, or by bonding the electrode provided with the interface resistance reducing composition to the electrolyte membrane, or by bonding the electrolyte membrane provided with the interface resistance reducing composition to the electrode provided with the interface resistance reducing composition, it is possible to sandwich the interface resistance reducing composition between the electrode and the electrolyte membrane. Further, examples of the above-mentioned method include a step of laminating a film consisting of the interface resistance reducing composition singly between the electrode and the electrolyte membrane and bonding the film to another and a step of maintaining the established spacing between the electrode and the electrolyte membrane in advance and injecting the interface resistance reducing composition into the spacing.

From the viewpoint of industrial production such as workability and reproducibility, the step of providing the interface resistance reducing composition on the electrode and/or the electrolyte membrane and then bonding them to each other is preferred. Example of the method of providing the interface resistance reducing composition on the electrode or the electrolyte membrane include a method of directly coating the catalyst surface of the electrode or the electrolyte membrane, and a method of applying the interface resistance reducing composition to another base material, and bonding this base material to the electrode or the electrolyte membrane, and then removing the base material.

As a method of applying the interface resistance reducing composition, generally, a publicly known method can be employed, and techniques such as spray coating, brushing, dip coating, slit dye coating, curtain coating, flow coating, spin coating, and screen printing can be applied. Further, when the interface resistance reducing composition cannot be applied at room temperature, a hot-melt coating method, in which the interface resistance reducing composition is heated to be melted, and applied by the above-mentioned method and cooled, can be applied. And, after providing the interface resistance reducing composition on the electrode or the electrolyte membrane, the electrode and the electrolyte membrane are bonded to each other. In this process, it is preferred to adjust the viscosity of the interface resistance reducing composition to such a level that the interface resistance reducing composition is not fluidized, and when a solvent is used in order to dissolve a plasticizer and a polymer material having an ionic group, it is possible to adjust the viscosity by drying a part of the plasticizer and the solvent in the interface resistance reducing composition after applying the interface resistance reducing composition so that the plasticizer and the solvent do not have a detrimental effect on the electrode and the electrolyte membrane. Particularly, when a solvent is used, by appropriately determining a degree of drying of the solvent experimentally, it becomes possible to adjust the viscosity of the interface resistance reducing composition at the time of preparing the membrane electrode assembly.

Preferably, the viscosity of the interface resistance reducing composition used for the present invention becomes low as temperature becomes higher than room temperature in pressing or coating, and for example, the value of Y/X is preferably 0.3 or less when the viscosity at 30° C. is regarded as X (Pa) and the viscosity at 80° C. is regarded as Y (Pa), which viscosity is measured at a shear rate of 35 ($s^{-1}$) using a rotating rheometer in a state of containing a polymer material having an ionic group and a plasticizer, and a solvent in some cases. Y/X obtained by thus measuring represents the temperature dependency of viscosity of the interface resistance reducing composition and a smaller value of Y/X means that the viscosity change in a temperature range of 30 to 80° C., which can be adopted in production, is large. Therefore, when the value of Y/X is 0.3 or less, handling in the step of preparing the membrane electrode assembly at room temperature is easy and it is preferred from the viewpoint of workability, and in hot pressing or hot melt coating at room temperature or higher, the fluidity of the interface resistance reducing composition increases (viscosity is decreased) and the followability of a catalyst layer can be enhanced and it is preferred from the viewpoint of increasing an output of a membrane electrode assembly. Y/X of 0.2 or less is more preferred, and Y/X of 0.1 or less is furthermore preferred.

A value of viscosity X at 30° C. is preferably 50 Pa or more from the viewpoint of workability, more preferably 70 Pa or more, and furthermore preferably 100 Pa or more, and it may be as high as unmeasurable. A value of viscosity Y at 80° C. is preferably as small as possible from the viewpoint of the followability of a catalyst layer.

Such the interface resistance reducing composition can be produce by the following method. For example, the polymer material having an ionic group is dissolved with a solvent which can dissolve the polymer material having an ionic group in such a way that the proportion of the polymer material in the solvent is 10% by weight or more and can be uniformly mixed with the plasticizer is preferred, and to this, a prescribed amount of a plasticizer is added. Generally, since the plasticizer is a poor solvent which cannot dissolve the polymer material having an ionic group, the polymer material having an ionic group is deposited and it is difficult to obtain a homogeneous interface resistance reducing composition. However, the present inventors have found that in some combination of the polymer material having an ionic group and the plasticizer, by the action of an ionic group of the polymer material having an ionic group and a functional group of the plasticizer, the interface resistance reducing composition becomes gel form or rubber form at room temperature to have low fluidity, but there is a combination at which by heating and mixing, interface resistance reducing composition is fluidized. Such a phenomena is a phenomena in which fluidization is restricted by the high hydrogen bonding force between constituent components at room temperature though a large amount of the plasticizer and the solvent are contained, but by raising temperature, number of hydrogen bonds decreases and fluidization occurs. That is, when change in the number of hydrogen bonds is reversible, change between the fluidization and non-fluidization occurs reversibly according to temperature. As such a combination of the polymer material having an ionic group and the plasticizer, a combination of the polymer material having a sulfonic group or a derivative thereof as an ionic group and the plasticizer having a hydroxyl group, an amide group, or carboxyl group is preferred, and among others, polyhydric alcohols such as glycerin are preferably used as a plasticizer from the viewpoint of storage stability and workability.

Preferably, Y/X is experimentally determined appropriately based on the coating method of the interface resistance reducing composition or the production conditions of the membrane electrode assembly, but this control can be implemented by the species and the density of ionic group of the polymer material having an ionic group, the species and an amount of the plasticizer, and an amount of the solvent, and the composition of the interface resistance reducing composition is experimentally determined appropriately in accordance with the material and the production conditions to be selected. The solution, herein, may remain in the interface resistance reducing composition for facilitating uniform mixing of the polymer material having an ionic group and the plasticizer and for adjusting Y/X, or may be removed through drying before using for preparing the membrane electrode assembly as an interface resistance reducing composition. and in the condition of removing, Y/X can be adjusted.

Further, the polymer material having an ionic group and the plasticizer can also be mechanically mixed at a temperature below a decomposition temperature or a boiling point of the plasticizer with a mixer or kneader even though the solvent is not used, and the resulting mixture can also be formed into an interface resistance reducing composition in sheet form.

It is better that the change of viscosity of the interface resistance reducing composition is reversible before removing the plasticizer, and the interface resistance reducing composition is applied to a release paper or the interface resistance reducing composition is applied to the electrode directly and this applied substance may be cooled to room temperature once to store, and thereby time restriction in producing the membrane electrode assembly can be mitigated.

An amount of the interface resistance reducing composition to be applied is preferably 0.5 mg/cm$^2$ or more and 30 mg/cm$^2$ or less on a composition basis. The amount of 0.5 mg/cm$^2$ or more can fill the voids between the electrode and the electrolyte membrane and the cracks of a catalyst layer and low interface resistance can be achieved. When this amount is 30 mg/cm$^2$ or less, a probability that voids required for diffusing a fuel and a produced gas other than the voids between the electrode and the electrolyte membrane are filled is reduced and an adverse effect of the plasticizer contained the interface resistance reducing composition is reduced. An amount of the interface resistance reducing composition to be applied is more preferably 1 mg/cm$^2$ or more and 10 mg/cm$^2$ or less.

For combining the electrode and electrolyte membrane into one, publicly known methods (for example, a chemical plating method "J Electrochemical Science" (J. Electrochem. Soc.) described in "Electrochemistry", 1958, 53, 269; and heat-press bonding process for gas diffusion electrode and the like described in "Electrochemical Science and Technology", 1988, 135 (9), 2209) can be applied. A method of unifying the electrode and electrolyte membrane by hot press is a preferable approach, but temperature and pressure of press may be appropriately selected in accordance with a thickness, a water content of the electrolyte membrane, a catalyst layer, and an electrode base material. Further, in the present invention, combining of the electrode and electrolyte membrane by press even in a state that the electrolyte membrane is dried or absorbs water. Particularly, in accordance with the present invention, since even an electrolyte membrane, from which, usually, a membrane electrode assembly having good joining state between the electrode and the electrolyte membrane cannot be obtained if the electrolyte membrane is not in a state of absorbing water, can be pressed in a dry condition, a substantial contact area between the electrolyte membrane and the catalyst layer can be increased, and further since there is little contraction of the electrolyte membrane due to vaporization of water in hot pressing, a membrane electrode assembly of extremely high quality can be obtained, and as a result of this a high-performance fuel cell can be obtained. Specific examples of press method include a roller press in which pressure and a clearance are regulated and a plate press in which pressure is regulated, and a heating temperature can be appropriately selected according to the fluidity of the interface resistance reducing composition, and it is preferably in a range of room temperature to 130° C. from the viewpoint of industrial production or avoiding thermal decomposition of the polymer material having an ionic group. A pressure of the press is preferably as low as possible from the viewpoint of protection of the electrolyte membrane and the electrode, and in the plate press, this pressure is preferably 0.1 MPa to 10 MPa.

Moreover, when providing the interface resistance reducing composition on the electrolyte membrane, the catalyst layer of the electrode may be installed on the interface resistance reducing composition to form a membrane electrode assembly. Further, when providing the interface resistance reducing composition on the electrode, two electrodes provided with the interface resistance reducing composition, respectively, are bonded to each other to form a membrane electrode assembly in which the interface resistance reducing composition serves as the interface resistance reducing composition and the electrolyte membrane without newly preparing the electrolyte membrane. In this case, preferably, coating weight of the interface resistance reducing composition is thickened to the extent of not developing short circuit, and therefore the interface resistance reducing composition is preferably applied wider than at least one electrode area.

In addition, in the case where the membrane electrode assembly formed by combining the electrodes is used to generate power, since it is not clear how the conditions of the plasticizer becomes in the membrane electrode assembly after power generation over a long time and an effect of the existence of the plasticizer on the fuel cell is not clear, it is preferred that the plasticizer is removed as far as possible since. It is essential that the removal of the plasticizer is implemented by cleaning (extracting) by a solvent. The reason why the plasticizer is removed by extraction by a solvent is that wet removal is superior to heat removal in that for example, compared with the removal of the plasticizer through drying by heat, the deterioration due to thermal load on the electrolyte membrane and the catalyst layer of the electrode can be prevented, and an output of the fuel cell using the membrane electrode assembly of the present invention tends to increase, and the contraction of a coat after the plasticizer in the coat consisting of the interface resistance reducing composition escapes from the coat is small and the adhesion at the interface between the electrode or the electrolyte membrane and the coat become good. Particularly, as the removal of the plasticizer, it is preferred to clean (extract)/remove the plasticizer with water or an aqueous solution of alcohol particularly from the viewpoint of workability, environmental issues, prevention of catalyst poison. Therefore, it is industrially preferred that the plasticizer is also water-soluble.

As a specific removal step is to bring the membrane electrode assembly, which is formed by combining the electrode and the electrolyte membrane sandwiching the interface resistance reducing composition, into contact with the solvent which is a good solvent of the plasticizer and does not have a detrimental effect on members to be used such as the electrolyte membrane and the catalyst to remove the plasticizer. For example, when water-soluble plasticizer is used, there is a method of immersing the membrane electrode assembly in a solvent such as alcohol or an aqueous solution of alcohol for a certain time, a method of extracting/removing the plasticizer with steam or the like, or a method in which after setting the membrane electrode assembly in a cell of a fuel cell, the plasticizer is removed by feeding a solvent such as water, alcohol or an aqueous solution of alcohol, or steam from a fuel supply point, or in the case of using an aqueous solution of methanol as a fuel, there is a method in which the plasticizer is removed by feeding the aqueous solution of methanol on the anode side and produced water on the cathode side at the time of power generation for both removal of the plasticizer and initial aging.

The method of producing a membrane electrode assembly of the present invention can be applied to all electrolyte membranes such as perfluoro base electrolyte membranes typified by Nafion (registered trademark, produced by Du Pont Kabushiki Kaisha) and hydrocarbon base electrolyte membranes, but this method is particularly suitable for producing a membrane electrode assembly using an electrolyte membrane having high heat resistance, high strength, a high tensile elastic modulus and a low water content described above. Examples of the electrolyte membrane include, specifically, electrolyte membranes having a glass transition point of 130° C. or higher, a tensile elastic modulus of 100 MPa or more, and a water content of 40% by weight or less, and include aromatic hydrocarbon polymers having an ionic group such as ionic group-containing poly(phenylene oxide), ionic group-containing polyetherketone, ionic group-containing polyetheretherketone, ionic group-containing polyether sulfone, ionic group-containing polyetherethersulfone, ionic group-containing polyether-phosphineoxide, ionic group-containing polyetherether phosphineoxide, ionic group-containing poly(phenylene sulfide), ionic group-containing polyamide, ionic group-containing polyimide, ionic group-containing polyether imide, ionic group-containing polyimidazole, ionic group-containing polyoxazole, ionic group-containing polyphenylene, ionic group-containing polyazomethine, ionic group-containing polyimideazomethine, and ionic group-containing polyolefin polymer crosslinked thereof like ionic group-containing polystyrene and ionic group-containing styrene-maleimide crosslinked polymer. These polymer materials can be used alone or in combination of two or more species, and can be used as a polymer blend or a polymer alloy, or a laminated membrane of two-layer or more. Further, the scopes of the ionic group and the introduction method, the synthetic method, and the molecular weight of an ionic group, here, are as stated previously. Particularly, as the ionic group, the polymer material having a sulfonic acid group is most preferable as described above. An example of use of the polymer material having a sulfonic acid group includes a method in which a polymer containing a —$SO_3M$ group (M is metal) is formed into film form from a solution state, and then heat-treated at elevated temperature to eliminate a solvent, and the resulting film is proton-substituted to obtain a membrane. As the foregoing metal M, a substance capable of forming a sulfonic acid and its salt may be used, but from the viewpoint of price and environmental burden, Li, Na, K, Rb, Cs, Mg, Ca, Sr, Ba, Ti, V, Mn, Fe, Co, Ni, Cu, Zn, Zr, Mo, and W are preferred, and among these metals, Li, Na, K, Ca, Sr, and Ba are more preferred, and Li, Na, and K are furthermore preferred. By forming a film in a state of salts of these metals, treatment at elevated temperature becomes possible, and this method is suitable for polymer materials family which can attain a high glass transition point and low water absorption.

As a temperature of the foregoing heat treatment, 100 to 500° C. is preferred in point of water absorption of a membrane to be obtained, 200 to 450° C. is more preferred, and 250 to 400° C. is furthermore preferred. A temperature of 100° C. or higher is preferred for attaining low water absorption. On the other hand, when in a temperature of 500° C. or lower, it is possible to prevent decomposition of the polymer material.

As a heat treatment time, a time of 10 seconds to 24 hours is preferred in point of productivity, 30 seconds to 1 hour is more preferred, and 45 seconds to 30 minutes is furthermore preferred. When the heat treatment time is 10 seconds or more, a solvent can be adequately removed, and a sufficient effect of suppressing a fuel crossover can be obtained. Further, if it is 24 hours or less, the decomposition of a polymer does not occur, and proton conductivity can be maintained and productivity becomes high.

As a method of preparing the electrolyte membrane, a method, in which a polymer solution is applied by a proper coating method, a solvent is removed, and applied polymer is treated at elevated temperatures and then treated with acid, can be exemplified. As a coating method, techniques such as spray coating, brushing, dip coating, dye coating, curtain coating, flow coating, spin coating, and screen printing can be applied.

In a coating method using a solvent, the membrane can be formed through drying of a solvent by heating and wet setting of the membrane by a solvent which does not dissolve the polymer, and on the other side in a coating method not using a solvent, a method of curing the polymer by light, heat or wet air, and a method of heating and melting the polymer, forming the polymer in film form and cooling can be applied.

As a solvent used for preparing a film, for example, non-protonic polar solvents such as N,N-dimethylacetamide, N,N-dimethylformamide, N-methyl-2-pyrrolidone, dimethylsulfoxide, sulfolane, 1,3-dimethyl-2-imidazolidinone and hexa-methylphosphorus triamide; ester solvents such as γ-butyrolactone and butyl acetate; carbonate solvents such as ethylene carbonate and propylene carbonate; alkylene glycol monoalkyl ethers such as ethylene glycol monomethyl ether, ethylene glycol monoethyl ether, propylene glycol monomethyl ether, propylene glycolmonoethyl ether and the like; and alcohol solvents such as isopropanol are suitably used.

As a film thickness of an electrolyte membrane to be used, a thickness of 3 to 2000 µm is suitably used. In order to attain the membrane strength enduring practical use, a thickness of 3 µm or more is preferred, and In order to reduce the membrane resistance, that is to improve performance of power generation, a thickness of 2000 µm or less is preferred. A thickness of a membrane is more preferably 5 to 1000 µm, and furthermore preferably 10 to 500 µm.

The thickness of the membrane can be controlled by various methods. For example, when the membrane is prepared by a solvent casting method, the thickness of the membrane can be controlled by a concentration of a solution or an application thickness on a substrate, and when the membrane is prepared by a casting polymerization method, the thickness can be adjusted by a thickness of spacer between plates.

Further, in the electrolyte membrane and the polymer material having an ionic group of the present invention, a whole portion or a part of a polymer structure can also be crosslinked by a means such as radiation irradiation as required. By crosslinking, an effect of further suppressing a fuel crossover and swelling due to a fuel cane expected, mechanical strength may be enhanced and the polymer material may become more preferable. Examples of species of the radiation irradiation include electron beam irradiation and γ ray irradiation. By having a crosslinked structure, it is possible to inhibit the distance between the polymer chains from expanding due to the permeation of water or fuel. A quantity of water to be absorbed can be limited and the swelling due to fuel can be suppressed, and consequently the fuel crossover can be reduced. Since the crosslinked structure can add constraints to the polymer chain, it can impart heat resistance and stiffness to the polymer material. The crosslinking, herein, may be a chemical crosslinking or a physical crosslinking. This crosslinked structure can be formed by publicly known methods, and for example, it can be formed by copolymerization of polyfunctional monomers or electron beam irradiation. Particularly, the crosslinking by the polyfunctional monomer is preferred from the viewpoint of economics, and example of this include a product formed by copolymerizing a monofunctional vinyl monomer with a polyfunctional monomer and a substance formed by crosslinking a polymer having a vinyl group or an allyl group with the polyfunctional monomer. The crosslinked structure, herein, means a state in which the fluidity is not substantially exhibited against heat, or a state of substantially insoluble in a solvent.

Further, in the electrolyte membrane of the present invention, fillers or inorganic fine particles may be included for the purpose of improving mechanical strength, thermal stability of the ionic group; and processability to the extent of not impairing the ionic conductivity and the effect of suppressing a fuel crossover, a network or fine particles consisting of polymer or metal oxide may be formed, or the electrolyte membrane of the present invention of the present invention may be a membrane formed by impregnating a support with a polymer.

Next, an example of the electrode suitable for the membrane electrode assembly of the present invention will be described. Such an electrode comprising the catalyst layer and the electrode base material. The catalyst layer referred to herein is a layer including a catalyst promoting an electrode reaction, an electron conductor, and anion conductor. As the catalyst contained such a layer, a catalyst of noble metals such as platinum, palladium, ruthenium, rhodium, iridium and gold is preferably used. These metals may be used alone or in combination of two or more species.

Further, when an electron conductor (conducting material) is used in the catalyst layer, a carbon material or an inorganic conductive material is preferably used in point of electron conductivity or chemical stability. Among others, amorphous and crystalline carbon material is preferably used. For example, carbon blacks such as channel black, thermal black, furnace black, and acetylene black are preferably employed because of high electron conductivity and large specific surface area. Examples of furnace black include ValcanXC-72R (registered trade name) produced by Cabot CORPORATION, Valcan P (registered trade name), black pear 880 (registered trade name), black pear 1100 (registered trade name), black pear 1300 (registered tradename), black pear 2000 (registered tradename), Regal 400 (registered trade name), Ketjen Black EC (registered trade name) produced by Ketjen Black Internationak, EC 600JD, #3150, #3250 produced by Mitsubishi Chemical Corporation. Examples of acetylene black include Denka Black produced by DENKI KAGAKU KOGYO K.K. Further, in addition to carbon black, natural graphite, synthetic graphite obtained from organic compounds such as pitch, cokes, polyacrylonitrile, phenol resin, furane resin, and carbon can be used. As the configuration of these carbon materials, infinite-shaped particle, fiber form, flake form, tube form, cone form, and megaphone form can be used. Further, carbon materials obtained by post-treating these carbon materials can also be used.

Further, when an electron conductor is employed, it is preferred in point of the electrode performance that the electron conductors are uniformly dispersed together with the catalyst particles in the catalyst layer. Therefore, preferably, the catalyst particles and the electron conductors are dispersed well in advance as a coating solution. In addition, use of a catalyst supported carbon in which the catalyst and the electron conductor are unified as a catalyst layer is also a preferred embodiment. By using this catalyst supported carbon, utilization efficiency of the catalyst is increased, and this contributes to an improvement in battery performance and cost-reduction. Herein, also in when the catalyst supported carbon is used in the catalyst layer, it is possible to add a conductive agent in order to enhance the electron conductivity further. As such a conductive agent, the above-mentioned carbon black preferably used.

As substances having ionic conductivity (ion conductor) to be used for a catalyst layer, generally, various organic and inorganic materials are publicly known, but when it is used for the fuel cell, polymers (ion conductive polymer) having an ionic group such as a sulfonic acid group, a carboxylic acid group and a phosphoric acid group, which improve the ionic conductivity, are preferably used. Among others, polymers having ionic conductivity, constructed from a fluoroalkyl ether side chain and a fluoroalkyl ether main chain, or the polymer electrolyte material of the present invention are preferably used from the viewpoint of the stability of an ionic group. As a perfluoro base ion conducting polymer, Nafion (registered trademark,) produced by Du Pont Kabushiki Kaisha, Aciplex (registered trademark,) produced by Asahi Kasei Corporation, and Flemion (registered trademark) produced by ASAHI GLASS CO., LTD. are preferably used. These ion conductive polymers are installed in the catalyst layer in a state of liquid or a dispersion. In the installation, a solvent in which the polymer is dissolved or dispersed is not particularly limited, but a polar solvent is preferred from the solubility of the viewpoint of ion conductive polymers. Further, the above-mentioned hydrocarbon polymer materials, which are preferred as a electrolyte membrane, can also be suitably used for substances having ionic conductivity (ion conductor) in the catalyst layer. Particularly in the case of a fuel cell In which an aqueous solution of methanol or methanol is used as a fuel, the above-mentioned hydrocarbon polymer materials may be effective in durability from the viewpoint of methanol resistance.

Since the foregoing catalyst and electron conductors are generally powder, it is common that the ion conductor play a role to solidify these powder. It is preferred from the viewpoint of electrode performance that this ion conductor is added in advance to a coating solution which is predominantly composed of catalyst particles and electron conductors and applied in a state of being dispersed uniformly in preparing the catalyst layer. An amount of ion conductor contained in the catalyst layer have to be appropriately determined in accordance with electrode characteristics required or the conductivity of the ion conductor to be used and it is not particularly limited, but preferably, it is within a range of 1 to 80% in terms of a weight ratio, and more preferably, within a range of 5 to 50%. When the amount of the ion conductor is too small, ionic conductivity is low, and when it is too large, this interferes with gas permeation, and both cases may deteriorate the electrode performance.

Such a catalyst layer may contain various substances in addition to the above-mentioned catalyst, electron conductivity, and ion conductor. Particularly, this catalyst layer may contain a polymer other than the ion conductive polymer described above in order to enhance a binding property between substances contained in the catalyst layer.

As such a polymer, polymers containing a fluorine atom such as polyvinyl fluoride (PVF), polyvinylidene fluoride (PVDF), polyhexafluoropropylene (FEP), polytetrafluoroethylene and perfluoroalkylvinyl ether (PFA), copolymer thereof, copolymers of monomer units composing these polymers and another monomers such as ethylene and styrene, or blend polymers can be used. The contents of these polymers in the catalyst layer are preferably 5 to 40% on the weight basis. When the content of the polymer is too large, electron and ion resistance increases and performance of the electrode tends to be deteriorated.

Further, when a fuel is liquid or vapor, the catalyst layer preferably has a structure through which this liquid or vapor can easily permeate, and preferably, this structure also has a structure to promote the discharge of a by-product associated with an electrode reaction.

As an electrode base material, a substance having low electric resistance and capable of collecting or supplying the electric power. Further, when foregoing catalyst layer serves as a collector, it is not necessary particularly to use the electrode base material. Examples of materials constituting the electrode base material include carbon and inorganic conductive material, and a calcined substance from polyacrylonitrile, a calcined substance from pitch, carbon material such as graphite and expansive graphite, stainless steel, molybdenum, and titanium are exemplified. These configuration is not particularly limited and the material is used in fiber form or in particle form, but a conductive material in fiber form (conductive fiber) such as carbon fiber is preferred from the viewpoint of fuel permeation. As the electrode base material using a conductive fiber, both a fabric and a nonwoven fabric can be used. For example, carbon paper TGP series, SO series produced by Toray Industries Inc., Carbon cloth produced by E-TEK are used. As such a cloth, plain weave, twill weave, sateen weave, damask, tapestry are employed without limit. Furthermore, as a nonwoven fabric, a paper machine method, a needle punching method, a spun-bonding method, a water-jet punching method, and a melt blow method are used without limit. Further, knit may be used. In these cloth, particularly when carbon fiber is used, the following method can be used. Nonwoven treatment by a needle punching method or a water-jet punching method is applied to the fabric or the flameproofed yarn obtained by carbonizing or graphitizing a plain weave using flameproofed spun yarn. Thereafter, using nonwoven fabric, flameproofed yarn, or carbonized yarn, or graphitized yarn obtained by carbonizing or graphitizing this nonwoven fabric or flameproofed yarn again, a mat nonwoven fabric is formed by a paper machine method and this is preferred used. It is preferred to use a nonwoven fabric or a cloth since thin and strong cloth ca be obtained.

Examples of carbon fibers used for such the electrode base material include polyacrylonitrile (PAN) carbon fiber, phenolic carbon fiber, pitch carbon fiber, and rayon carbon fiber.

Such a electrode base material can be subjected to water-repellent treatment in order to prevent the reduction in diffusion and permeation of gas due to water accumulation, or can be subjected to partial water-repellent treatment or hydrophilizing treatment in order to form a water drain passage, or carbon powder can be added to the electrode base material to reduce resistance. Further, a conductive inter-membrane containing at least an inorganic conductive material and a hydrophobic material can be installed between the electrode base material and the catalyst layer. Particularly when the electrode base material is a carbon fiber fabric or nonwoven fabric with high void ratio, by installing the inter-membrane, the reduction in performance resulting from the penetration of the catalyst layer into the electrode base material can be inhibited.

Rr can be employed as a measure representing the interface resistance of the membrane electrode assembly of the present invention. The detail of Rr will be described in a paragraph (6) in [Measuring method] described later.

Examples of a fuel of the fuel cell using the membrane electrode assembly produced by the method of the present invention include oxygen, hydrogen, and organic compounds having 1 to 6 carbon atoms such as methane, ethane, propane, butane methanol, isopropyl alcohol, acetone, glycerin, ethylene glycol, formic acid, acetic acid, dimethyl ether, hydrochinone, cyclohexane and the like, and mixtures of these compounds and water, and these compounds may be used singly or as a mixture of two or more species. Particularly, fuels containing hydrogen, and organic compounds having 1 to 6 carbon atoms are suitably used from the viewpoint of power generation efficiency and simplification of the whole cell system, and hydrogen and methanol are particularly preferred in point of power generation efficiency. When an aqueous solution of methanol is used, the concentration of methanol is appropriately selected in accordance with a system of a fuel cell to be used, but as high concentration as possible is preferred from the viewpoint of driving for a long. For example, in an active fuel cell having a system, such as a feed pump and a fan, for sending a medium required for power generation to a membrane electrode assembly, and auxiliary equipment such as a cooling fan, a fuel dilution system, and a product recovery system, it is preferred to feed methanol having a concentration of 30 to 100% or more from a fuel tank or a fuel cylinder and dilute it to about 0.5 to 20% and send it to the membrane electrode assembly, and on the other hand in a passive fuel cell not having auxiliary equipment, methanol having a concentration of 10 to 100% is preferred.

Hereinafter, further preferred embodiment of the present invention will be described.

The present invention pertains to a membrane electrode assembly formed by sandwiching an electrolyte membrane between a pair of electrodes, wherein the membrane electrode assembly has a layer (A) at least between one electrode and the electrolyte membrane, and the value of the storage modulus C is 1 GPa or more when the storage modulus of the electrolyte membrane, which is measured with an ultramicro penetrometer, is regarded as C and the storage modulus of the layer (A) is regarded as D.

The layer (A), herein, can use the substantially same material as the above-mentioned polymer material having an ionic group in the interface resistance reducing composition. Herein, the substantially same material as the polymer material having an ionic group in the interface resistance reducing composition means that principal components are the same material. Herein, that principal components are the same material means that the same materials make up 50% by weight or more of the materials composing the electrolyte membrane and the layer (A), respectively. In this case, even if polymer materials having an anionic group, which is contained in the interface resistance reducing composition, are different in the density and the species of the ionic group, these polymer materials can be treated as the same material when these materials have the same main chain skeleton. Further, two polymer materials, for example, polyetheretherketone and polyetherketone, may be treated as the same material when the species of their groups binding aromatic rings are the same.

Furthermore, in the membrane electrode assembly of the present invention, it is preferred in point of adhesion of the interface that polymer materials composing the electrolyte membrane and the layer (A) are substantially the same. Here, if the materials common to the electrolyte membrane and the layer (A) make up 50% by weight or more of the electrolyte membrane and the layer (A), respectively, it may be considered that the electrolyte membrane has the same materials as those of the layer (A), even though different additives and polymer materials are mixed in the electrolyte membrane and the layer (A), respectively, and the electrolyte membrane and the layer (A) have different substituents and derivatives thereof, and different components are copolymerized with the electrolyte membrane or the layer (A). In addition, as described above, even if polymer materials composing the electrolyte membrane and the layer (A), having an ionic group, are different in the density and the species of the ionic group, these polymer materials can be treated as the same material when these polymer materials have the same main chain skeleton. Two polymer materials, for example, polyetheretherketone and polyetherketone, may be treated as the same material when the species of their groups binding aromatic rings are the same.

The present inventors have found out that the storage modulus in the present invention represents the stiffness of a material, and a material having higher stiffness, namely, having a larger value of storage modulus tends to have higher resistance to fuel and improved heat resistance, and these findings have lead to the present invention. That is, it is important to suppress the swelling due to a fuel for suppressing a fuel crossover, and on the other hand there is the correlation between the effect of suppressing the swelling and the storage modulus, and particularly when the storage modulus C of the electrolyte membrane constituting the membrane electrode assembly is 1 GPa or more, an effect of suppressing a fuel crossover is large. The storage modulus C of the electrolyte membrane is preferably 2 GPa or more, and more preferably 3 GPa or more. Furthermore, when the storage modulus D of the layer (A) is also 1 GPa or more, it is preferred since an effect of suppressing a fuel crossover can be further enhanced. It is more preferred when the storage modulus D is 2 GPa or more, and furthermore preferred when the storage modulus D is 3 GPa or more.

Since the present inventors thought that the reason why viscoelastic physical properties, particularly measured with an ultramicro penetrometer, in the extreme-surface of materials of the electrolyte membrane and the layer (A) have the high correlation with the superiority or inferiority of the fuel crossover is that absorption of a fuel starts from the surface of a material, they have noted the viscoelastic physical properties in the extreme-surface and therefore completed the present invention.

Measurement of the storage modulus can be performed by obtaining modulus mapping images [storage modulus (E') image·loss modulus (E") image] using an ultramicro penetrometer (Tribo Indenter manufactured by Hysitron Inc.).

For example, a membrane electrode assembly is embed in an epoxy rein for electron microscope (Quetol 812 produced by Nisshin EM Corporation), and this epoxy resin is cured, and then an ultra thin-section of a cross section of the membrane electrode assembly is prepared with an utramicrotome (ULTRACUT S manufactured by Leica Microsystems AG) to obtain a sample. This sample is measured under the following conditions, and a modulus is determined using Hertz's theory.

Measuring apparatus: Tribo Indenter manufactured by Hysitron Inc.
Indenter: Cubecorner indenter made of diamond (radius of curvature 50 nm)
Measuring field: about 30 mm square
Measuring frequency: 200 Hz
Measuring atmosphere: room temperature & in the air
Contact load: 0.3 µN Hereinafter, a measurement principle by an ultramicro penetrometer will be described.

The stiffness (K) of a measuring system in pushing an axisymmetric indenter into a sample is known to be expressed by the following equation (1).

Equation (1)

$$K = \frac{2}{\sqrt{\pi}} \sqrt{A}\, E^* \quad (1)$$

In the above equation, A is a projection area of a pressed trace produced by the contact of the sample with the indenter, and E* is an elastic modulus of a combined system of an indenter system and a sample system.

On the other hand, when the indenter comes into contact with the extreme surface of a sample, it is thought that an indenter tip is regarded as a sphere and Hertz's contact theory on the contact between a sphere and a semi-infinite plate can be applied. In the Hertz's contact theory, a radius a of a projection area of a pressed trace produced when the indenter contacts the sample is expressed by the equation (2).

Equation (2)

$$a = \left(\frac{3PR}{4E^*}\right)^{\frac{1}{3}} \quad (2)$$

Here, P is a load, and R is a radius of curvature of the indenter tip.

Therefore, a projection area A of a pressed trace produced by the contact of the sample with the indenter is expressed by the equation (3), and E* can be determined by using the equations (1) to (3).

Equation (3)

$$A = \pi a^2 = \pi \left(\frac{3PR}{4E^*}\right)^{\frac{2}{3}} \quad (3)$$

Modulus mapping is a method in which based on the above-mentioned Hertz's contact theory, the indenter is brought into contact with the extreme surface of a sample, and vibrated minutely during a test to yield a response amplitude and a phase difference to the vibration as a function of time to determine K (stiffness of a measuring system) and D (sample dumping).

When this vibration is a simple harmonic oscillator, the total of force (detected load component) F(t) in the direction in which an indenter penetrates into a specimen is expressed by the following equation (4).

Equation (4)

$$F(t) = m\frac{d^2h}{dt^2} + D\left(\frac{dh}{dt}\right) + Kh \quad (4)$$

Here, the first term of the equation (4) represents a force (m: mass of an indenter stem) derived from an indenter stem, the second term of the equation (4) represents a force derived from viscous ingredient, the third term of the equation (4) represents stiffness of a sample system, and t represents time. Since F(t) of the equation (4) depends of time, it is expressed as the equation (5).

Equation (5)

$$F(t) = F_0 \exp(i\omega t) \quad (5)$$

In the above equation, $F_0$ is a constant, and ω is an angular frequency. If the equation (5) is substituted into the equation (4), and the equation (6), which is a special solution of an ordinary differential equation, is substituted to solve an equation, relational expressions (7) to (10) can be obtained.

Equation (6)

$$h = h_0 \exp\{i(\omega t - \phi)\} \quad (6)$$

Equation (7)

$$\left|\frac{F_0}{h_0}\right| = \sqrt{(K - m\omega^2)^2 + (D\omega^2)} \quad (7)$$

Equation (8)

$$\tan\phi = \frac{D\omega}{K - m\omega^2} \quad (8)$$

Equation (9)

$$K = \frac{F_0}{h_0}\cos\phi + m\omega^2 \quad (9)$$

Equation (10)

$$D = \frac{F_0}{h_0 \omega}\sin\phi \quad (10)$$

Here, φ is a phase difference. Since m is known at the time of measuring, K and D can be determined from the equations (7) to (10) by measuring a vibration amplitude ($h_0$) of a displacement, a phase difference (φ) and an excited vibration amplitude ($F_0$) in measuring a specimen.

The equations (1) to (10) were formed regarding E* as a storage modulus (E'), and the storage modulus was determined from the equation (11) using the stiffness Ks (=K−mω²) derived from a specimen of the stiffness of a measuring system.

Equation (11)

$$E' = \frac{K_s \sqrt{\pi}}{2\sqrt{A}} \quad (11)$$

Further, in the membrane electrode assembly of the present invention, the value of either the loss modulus E or the loss modulus F is preferably 0.1 GPa or more when the loss modulus of the electrolyte membrane is regarded as E and the loss modulus of the layer (A) is regarded as F.

The loss modulus represents the viscosity of material, and a substance having a higher loss modulus tends to be persisting and less prone to failure. When the loss modulus is 0.1 GPa or more, mechanical durability of the material is improved and the durability of the fuel cell using the membrane electrode assembly of the present invention is also improved. This value is preferably 0.2 GPa or more, and more preferably 0.3 GPa or m. Further, if both the loss modulus E of the electrolyte membrane and the loss modulus F of the layer (A) are 0.1 GPa or more, it is preferred since the durability of the fuel cell using the membrane electrode assembly of the present invention can be further improved, and it is more preferred if both the loss moduli E and F are 0.2 GPa or more, and it is furthermore preferred if both the loss moduli E and F are 0.3 GPa or more.

The loss modulus in the present invention can also be measured in the same manner as in the storage modulus described above, and the loss modulus was determined from the equation (12) formed together with the equation (11) using stiffness Ks derived from a specimen of the stiffness of a measuring system in the above equation (8).

Equation (12)

$$E'' = \frac{\omega D \sqrt{\pi}}{2\sqrt{A}} \quad (12)$$

Further, in the membrane electrode assembly of the present invention, the value of at least either C/D or E/F is preferably 0.5 to 1.5. Since C/D and E/F are ratios of the electrolyte membrane and the layer (A) in viscoelastic physical properties of an extreme-surface and these values are measures of a degree of deformation of each layer at the interface bonded, when the values of C/D and E/F are 0.5 to 1.5, degrees of deformations of the electrolyte membrane and the layer (A) are similar to each other in various operating environments of a fuel cell in which the membrane electrode assembly of the present invention is incorporated. Therefore, peeling or deformation of the membrane and the layer can be reduced and the durability is improved. It is more preferred that either C/D or E/F is 0.7 to 1.4, and furthermore preferred that either C/D or E/F is 0.8 to 1.3. Further, when both C/D and E/F are 0.5 to 1.5, it is preferred since peeling or deformation of the membrane and the layer can be further reduced and the durability is further improved. It is more preferred that both C/D and E/F are 0.7 to 1.4, and furthermore preferred that both C/D and E/F are 0.8 to 1.3.

Hereinafter, further preferred embodiment of the present invention will be described.

The membrane electrode assembly of the present invention is formed by sandwiching an electrolyte membrane between a pair of electrodes and has a layer (A) having a substantially different phase difference, which is measured by scanning on a tapping mode of a scanning probe microscope, from the electrolyte membrane at least between one electrode and the electrolyte membrane, and the electrolyte membrane and the layer (A) contain aromatic hydrocarbon having an anionic group.

The phase difference in the present invention is a measure of the softness and can be measured by the following-method. For example, a membrane electrode assembly is embed in an epoxy rein for electron microscope (Quetol 812 produced by Nisshin EM Corporation), and this epoxy resin is cured, and then an ultra thin-section of a cross section of the membrane electrode assembly is prepared with an utramicrotome (UL-TRACUT S manufactured by Leica Microsystems AG) to measure the phase difference by scanning on a tapping mode of a scanning probe microscope.

A tapping mode in the present invention is a method in which a vibrating prove is approached to a sample from above the sample and brought into light contact with the sample to obtain AFM images or phase images of the sample as described in "scanned probe microscope for nanotechnology", edited Surface Science Society of Japan, Maruzen Co., Ltd. (2002), and "Characterization and optimization of scan speed for tapping-mode atomic force microscopy; Rev. Sci. Instrum., vol. 73, No. 8, pp. 2928-2936 (2002); American Institute of Physics As the name of this method, there are "intermittent contact mode", "cyclic contact mode", and "dynamic force microscope" besides tapping mode, but the name of tapping mode is used in the present invention.

Measurement of the phase difference can be performed using a scanning probe microscope (Nanoscope IIIa, Dimension 3000) and a phase detection extender module (PHASE-D01 type), respectively, manufactured by US VEECO INSTRUMENTS INC. Specifically, a scanning range is set at 12.5 μm×25 μm, for example, and a measuring probe is scanned over the surface of a sample while vibrating the measuring probe at a resonance frequency (tapping mode scanning). In this time, the radius of curvature of a probe tip is 5 to 20 nm, and a tapping frequency is 150 to 450 kHz. Under such the conditions, scanning on tapping mode is performed to measure a phase difference (delay) between an AC signal outputted by tapping mode scanning and an AC signal inputted to vibrate the probe. By measuring the phase differences at every scanning points, a distribution of the phase difference in a scanning range can be outputted. A large value of phase difference is detected in a surface region where an interaction force with a probe is large, and a small value of phase difference is detected in a surface region where an interaction force with a probe is small. That is, the phase difference becomes large in a relatively soft area within a sample and it becomes small in a hard area, and the phase difference is a measure representing the softness of the surface.

Moreover, the membrane electrode assembly of the present invention has the layer (A) having a substantially different phase difference from the electrolyte membrane, and the electrolyte membrane and the layer (A) contain aromatic hydrocarbon having an anionic group on the main chain. Herein, the term having a substantially different phase difference means that first places of decimals of absolute values of the phase differences of the respective layers (the electrolyte membrane and the layer (A)) are different when measuring the electrolyte membrane and the layer (A) in the same field. Further, when some line of boundary is observed between the electrolyte membrane and the layer (A) in observing a sample of the ultra thin-section of a cross section of a membrane electrode assembly with a transmission electron microscope and the existence of the layer (A) is apparent, this means that second places of decimals of absolute values of the phase differences of the respective layers (the electrolyte membrane and the layer (A)) are different.

Further, even though the electrolyte membrane and the layer (A) are formed from the substantially same material, if the membrane electrode assemblies having different phase differences are obtained as a result of the variations in a higher structure of a polymer due to the difference between production processes, it may be thought that the membrane electrode assembly satisfying the above-mentioned measuring results is included in the scope of the invention.

Here, the reason why the membrane electrode assembly of the present invention may be a membrane electrode assembly having the layer (A) having a substantially different phase difference from the electrolyte membrane, in which the electrolyte membrane and the layer (A) contain aromatic hydrocarbon having an anionic group on the main chain. The present inventors have found out that even if each member of the electrode and electrolyte membrane to be used has excellent properties, if the resistance between the electrode and the electrolyte membrane is large when these members are combined into one, consequently, the performance of the membrane electrode assembly becomes insufficient, and these findings have lead to the present invention. Particularly, for suppressing the fuel crossover of the electrolyte membrane and for improving the durability in high-temperature service and the mechanical strength, such a molecular structure that high heat resistance of 120° C. or higher in glass transition point based on dynamic viscoelasticity, high elastic modulus of 100 MPa or more, preferably 500 MPa or higher, and furthermore preferably 1000 MPa or higher in tensile elastic modulus, high strength, and a low water content of 100% or less with respect to the weight of the electrolyte membrane are attained is preferred, and therefore the electrolyte membrane tends to be stiff. Accordingly, it is necessary to have the above-mentioned performance and to use an electrolyte membrane which is predominantly composed of aromatic hydrocarbon having an anionic group from the viewpoint of productivity and processability.

However, there has been a tendency that even if an excellent electrolyte membrane is found out for improving the performance of the membrane electrode assembly and the fuel cell using the membrane electrode assembly, since the electrolyte membrane is hardly deformed, the foregoing resistance between the electrode and the electrolyte membrane becomes large and expected performance of the membrane electrode assembly cannot be attained.

Thus, in the present invention, a layer which can suppress the fuel crossover, maintain the mechanical strength, fill at least a part of fine voids between the electrode and the electrolyte membrane, enhance the followability of the electrolyte to a catalyst surface and increase a contact area between the electrode and the electrolyte membrane practically, that is, a layer of polymer material, which has a substantially different phase difference from the electrolyte membrane and contains aromatic hydrocarbon having an anionic group on the main chain, is provided between the electrolyte membrane and the electrode.

Particularly when an aqueous solution of methanol of elevated temperature of 40° C. or higher or in high concentration of 20% by weight to 99.9% by weight is used, decrease in durability due to the deterioration of an interface between the membrane and the electrode tends to be recognized in bonding between the electrode and the electrolyte membrane by a common adhesive or a perfluoro base proton conducting polymer, but in the present invention, since the electrolyte membrane and the layer (A) having a substantially different phase difference from the electrolyte membrane consist of a polymer material containing aromatic hydrocarbon having an anionic group on the main chain, a membrane electrode assembly having high strength and high durability could be realized. Herein, aromatic hydrocarbon having an anionic group on the main chain refers to a unit in which the anionic group is coupled directly with an aromatic ring. Further, the reason why the foregoing anionic group is located on the main chain of aromatic hydrocarbon is that an effect of suppressing a fuel crossover is large.

That is, the reason why the foregoing anionic group is located on the main chain of aromatic hydrocarbon is that a polymer material in which aromatic hydrocarbon is located on the main chain is stiff and hardly moves and the anionic group is coupled directly with this aromatic hydrocarbon of the main chain, and therefore even if an aqueous solution of methanol penetrates into the polymer, a portion having the anionic group cannot move freely and consequently the percentage of fuel which can penetrates into the polymer can be controlled and the fuel crossover can be reduced.

In the membrane electrode assembly of the present invention, a phase difference (M) of the electrolyte membrane may be larger than or may be smaller than a phase difference (I) of the layer (A) having a substantially different phase difference from an electrolyte membrane, and the softness of the layer (A) having a substantially different phase difference from an electrolyte membrane may be varied in order to increase a contact area with the electrode in the production process of the membrane electrode assembly.

The ratio (M/I) between the phase difference (M) of the electrolyte membrane and the phase difference (I) of the layer (A) having a substantially different phase difference from an electrolyte membrane is preferably 0.1 to 10, and more preferably 0.5 to 2 (excluding the case of M/I=1).

A phase difference of the most bright portion of a portion excluding constituents of the membrane electrode assembly in an observation sample, that is, a phase difference of a cured substance of an epoxy resin to be used in preparing an ultra thin-section of the membrane electrode assembly is regarded as 0, and the normalized values of the phase differences of the electrolyte membrane portion and the layer near the electrode, respectively, are regarded as M and I, respectively, to determine the ratio between the phase differences M/I. When the ratio M/I between the phase differences falls within a range of 0.1 to 10 (excluding the case of M/I=1), a difference between expansion and a difference between contraction of the electrolyte membrane and the layer (A) having a substantially different phase difference from an electrolyte membrane are small, and it is preferred from the viewpoint of preventing a reduction in performance of the membrane electrode assembly particularly when using an aqueous solution of methanol of elevated temperature of 40° C. or higher or in high concentration of 20% by weight to 99.9% by weight.

Particularly when an aqueous solution of methanol of elevated temperature of 40° C. or higher or in high concentration of 20% by weight to 99.9% by weight is used, it is preferred to select and use an electrolyte membrane having a high suppressive effect of a fuel crossover, high heat resistance, high strength, a high tensile elastic modulus and a low water content as the membrane electrode assembly of the present invention, particularly as the electrolyte membrane, and the electrolyte membrane and the layer (A) having a substantially different phase difference from an electrolyte membrane preferably consist of electrolyte polymers having similar performance. Therefore, it is preferred that the respective principal components of materials composing the electrolyte membrane and the layer (A) having a substantially different phase difference from an electrolyte membrane of the membrane electrode assembly of the present invention are substantially the same, and from the viewpoint of adhesion of the interface between the electrolyte membrane and the layer (A) having a substantially different phase difference from an electrolyte membrane, the electrolyte membrane and the layer (A) are preferably formed from the substantially same material. Herein, the substantially same material means that the same materials make up 50% by weight or more of the materials composing the electrolyte membrane and the layer (A), respectively, as described above.

In this case, even if polymer materials to be used, which contain aromatic hydrocarbon having an anionic group on the main chain, are different in the density and the species of the anionic group, these polymer materials can be treated as the substantially same material when these materials have the same main chain skeleton. Further, two polymer materials, for example, polyetheretherketone and polyetherketone, may be treated as the same material when the species of their groups binding aromatic rings are the same.

Furthermore, if the same materials make up 50% by weight or more of the materials composing the electrolyte membrane and the layer (A), respectively, it may be considered that the electrolyte membrane has the same materials as those of the layer (A), even though different additives and polymer materials are mixed in the electrolyte membrane and the layer (A), respectively, and the electrolyte membrane and the layer (A) have different substituents and derivatives thereof, and different components are copolymerized with the electrolyte membrane or the layer (A). In addition, as described above, even if polymer materials composing the electrolyte membrane and the layer (A), which contain aromatic hydrocarbon having an anionic group on the main chain, are different in the density and the species of the anionic group, these polymer materials can be treated as the same material when these polymer materials have the same main chain skeleton. Moreover, two polymer materials, for example, polyetheretherketone and polyetherketone, may be treated as the same material when the species of their groups binding aromatic rings are the same.

Next, a polymer material containing aromatic hydrocarbon having an anionic group in the present invention will be described. As the anionic group, a group having the ability of proton exchange is preferred. As such a functional group, a sulfonic acid group (—$SO_2$(OH)), a sulfuric acid group (—$OSO_2$(OH)), a sulfonimide group (—$SO_2NHSO_2$R (R represents an organic group)), a phosphonic acid group (—PO(OH)$_2$), a phosphoric acid group (—OPO(OH)$_2$), a carboxylic acid group (—CO(OH)), and salts thereof can be preferably adopted. The foregoing polymer material can contain two or more species of these anionic groups, and the polymer material may become more preferable by the combination of these anionic groups. This combination is appropriately determined depending on a structure of a polymer or the like. Among others, it is more preferred to have at least any one of a sulfonic acid group, a sulfonimide group, and a sulfuric acid group from the viewpoint of high proton conductivity, and it is most preferred to have at least the sulfonic acid group from the viewpoint of hydrolysis resistance. When the polymer material has the sulfonic acid group, the density of the sulfonic acid group is preferably 0.1 to 5.0 mmol/g from the viewpoint of proton conductivity and the viewpoint of suppressing a fuel crossover, more preferably 0.5 to 3.5 mmol/g, and furthermore preferably 1.0 to 3.5 mmol/g. By setting the density of the sulfonic acid group to 0.1 mmol/g or more, a high output density can be drawn out, and by setting the density to 5.0 mmol/g or less, it is possible to prevent an interface resistance reducing layer from excessively swelling to be eluted or outflow due to a fuel for example when the interface resistance reducing composition is used in a fuel cell such as a direct methanol fuel cell in which it comes into contact directly with a liquid fuel.

Herein, the density of a sulfonic acid group is as stated previously.

Specific examples of the aromatic hydrocarbon having an anionic group on the main chain include aromatic hydrocarbon polymers having an ionic group introduced into an aromatic ring of the main chain such as poly(phenylene oxide), polyetherketone, polyetheretherketone, polyether sulfone, polyetherethersulfone, polyether-phosphineoxide, polyetherether phosphineoxide, poly(phenylene sulfide), polyamide, polyimide, polyether imide, polyimidazole, polyoxazole and polyphenylene from the viewpoint of mechanical strength, fuel resistance, and heat resistance of the electrolyte membrane and the layer (A) having a substantially different phase difference from an electrolyte membrane. These polymer materials can be used alone or in combination of two or more species, and can be used as a polymer blend or a polymer alloy.

Particularly preferably, materials composing the electrolyte membrane and the layer (A) are selected from polyetheretherketone containing a component derived from 9,9-bis(4-hydroxyphenyl)fluorene, polyetheretherketone containing a component derived from 4,4'-dihydroxytetraphenylmethane, polyetheretherketone containing a component derived from 4,4'-dihydroxybenzophenone and polyetherketone containing a component derived from 4,4'-dihydroxybenzophenone of the above-mentioned materials from the viewpoint of inhibition of a fuel crossover, mechanical strength, fuel resistance and heat resistance particularly when using an aqueous solution of methanol of elevated temperature of 40° C. or higher or in high concentration of 20% by weight to 99.9% by weight. These polymer materials can be used alone or in combination of two or more species, and can be used as a polymer blend or a polymer alloy.

A method of introducing an anionic group into these polymer materials is as stated previously.

Figure 4:
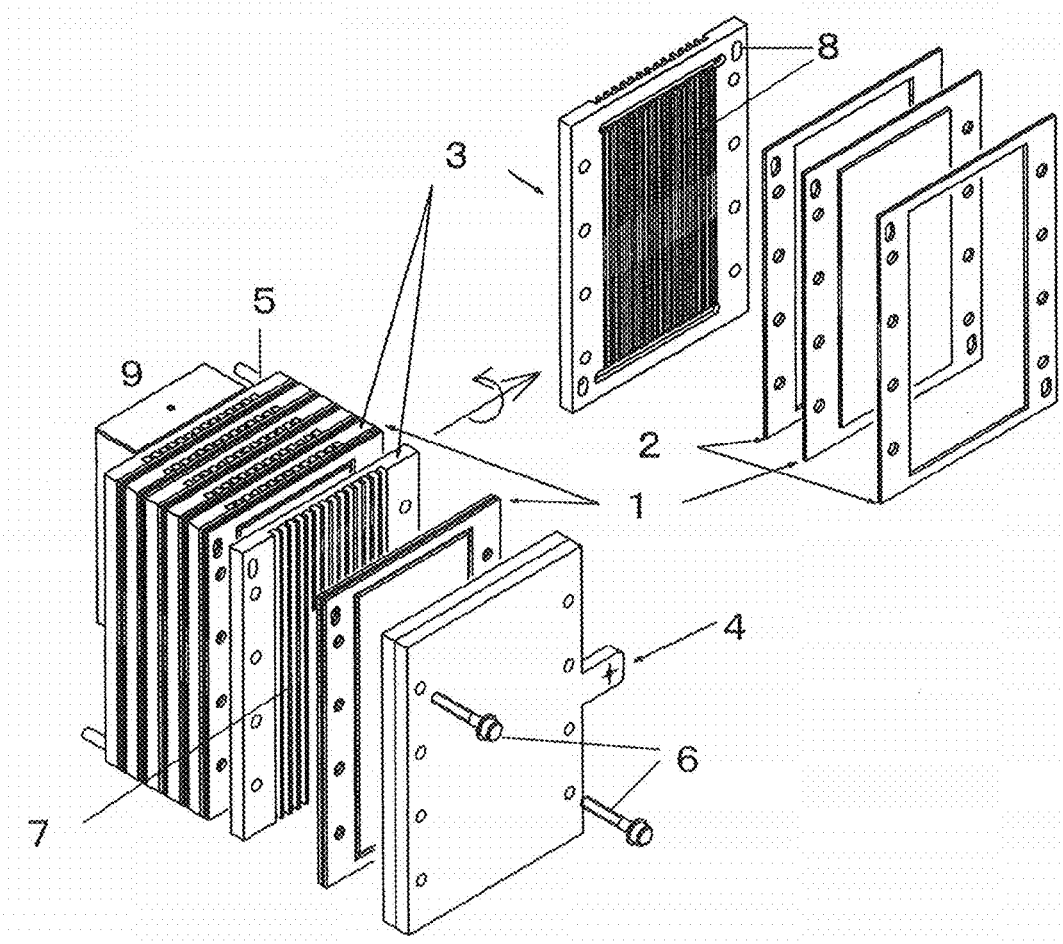
FIG. 4 is a view showing an example of a stacked fuel cell.

The membrane electrode assembly of the present invention may be used in a state of stacking a plurality of membrane electrode assemblies or may be used in a state of arraying a plurality of electrodes in series on an electrolyte membrane. An example of a fuel cell in a state of stacking a plurality of membrane electrode assemblies is shown in FIG. 4. A plurality of membrane electrode assemblies are placed in series by setting so as to sandwich the membrane electrode assembly between separators consisting of a conductive material, which has both fuel flow passages and air flow passages on the front side and the back side, such as carbon material or metal (however, an outermost separator has only one of the fuel flow passages and the air flow passages on one side) to form a fuel cell. Liquid fuel may be supplied from a fuel tank or the like by use of various pumps, or may be supplied by installing felt or nonwoven cloth in the fuel flow passage to utilize a capillary action. Air may be forcibly supplied with a fan or the like, or air naturally existing in the air flow passage may be used.

Figure 5:
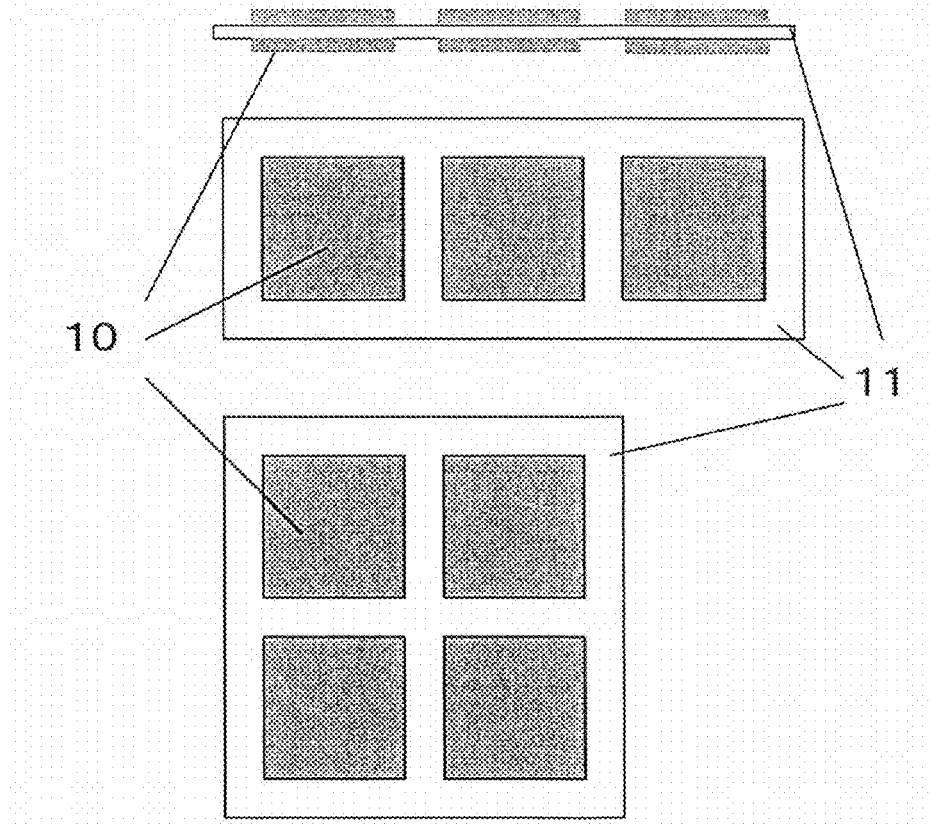
FIG. 5 is a view showing an example of a membrane electrode assembly.

When the membrane electrode assembly is used in a state of arraying a plurality of electrodes in series on an electrolyte membrane, a membrane electrode assembly formed by combining a plurality of electrodes with the electrolyte membrane can be used like an example of FIG. 5.

Figure 6:
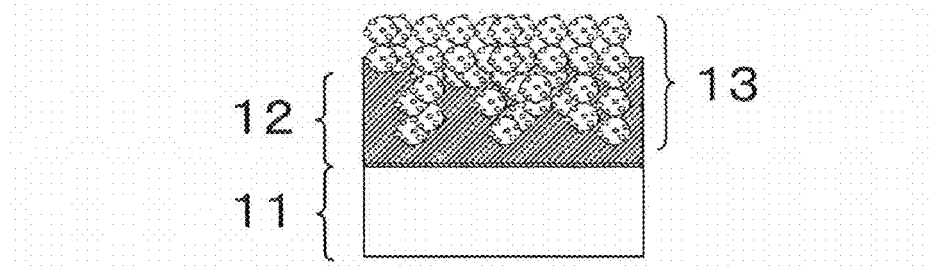
FIG. 6 is an enlarged image view of an electrode-electrolyte membrane portion.

The membrane electrode assembly of the present invention to be used for these fuel cells is bonded in a state of interposing the layer (A) 12 following the projections and depressions of the catalyst layer 4 as shown in an enlarged view of the interface between an electrode 10 and an electrolyte membrane 11 of FIG. 6.

Figure 7:
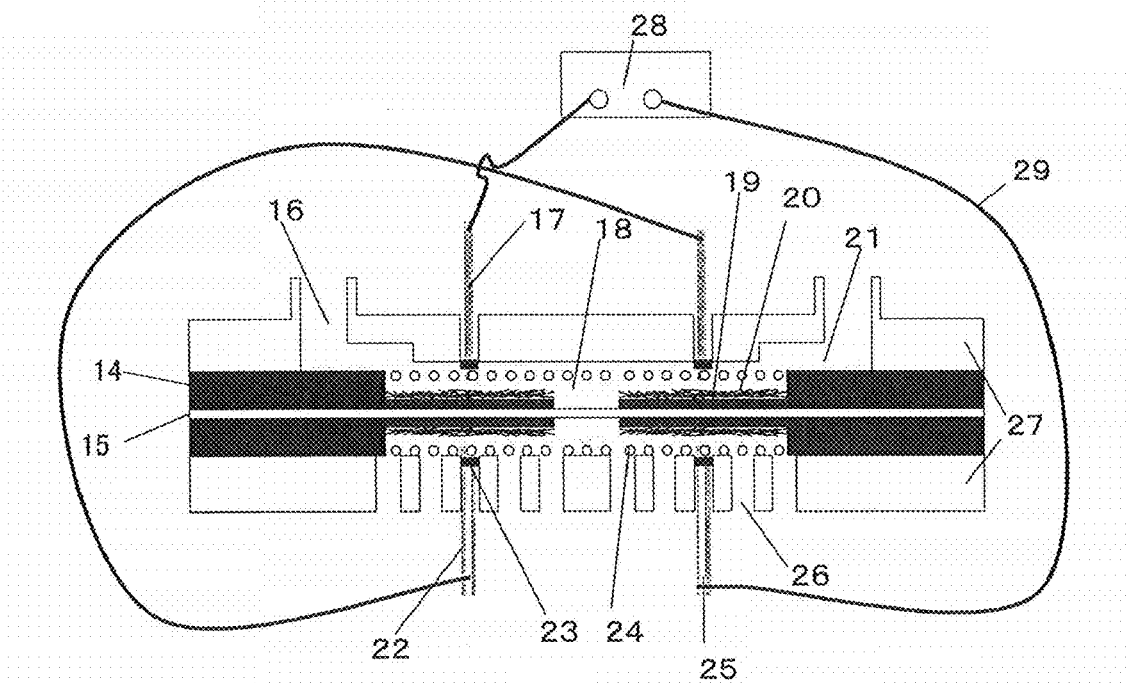
FIG. 7 is a sectional view of an example of a passive type fuel cell.

Further, FIG. 7 is a view showing an example of a passive type fuel cell not using auxiliaries.

Furthermore, a fuel cell may be incorporated into equipment to be used, or may be used as an external unit. And, it is preferred from the viewpoint of maintenance for a fuel cell to have a constitution in which the membrane electrode assembly is detachable from the cell of a fuel cell.

In the performance of the fuel cell of the present invention, since a supplying method of fuel and air, a configuration of a cell, a shape of a flow passage, a collecting method, and design of an electronic circuit vary with equipment to be driven, it is preferred that a size of the membrane electrode assembly, number of the membrane electrode assemblies, and number of series and/or parallels are appropriately selected in accordance with equipment design.

Performance of the membrane electrode assembly of the present invention varies depending on the selection of the electrolyte membrane or the layer (A), or an operating temperature and a fuel concentration to be used, and can be evaluated by incorporating the membrane electrode assembly into a commercially available single cell "EFC05-01SP" (a cell for electrode area 5 cm$^2$) manufactured by Electro-Chem-Technic.

Moreover, examples of a fuel of the fuel cell using the membrane electrode assembly of the present invention include, as described above, oxygen, hydrogen, and organic compounds having 1 to 6 carbon atoms such as methane, ethane, propane, butane methanol, isopropyl alcohol, acetone, glycerin, ethylene glycol, formic acid, acetic acid, dimethyl ether, hydrochinone, cyclohexane and the like, and mixtures of these compounds and water, and these compounds may be used singly or as a mixture of two or more species according to applications, but when the fuel cell is mainly used for portable equipment, a liquid feed type fuel is preferred. The liquid feed type means to supply liquid such as an aqueous solution of methanol to at least one electrode and it is preferred to supply liquid to the anode side. By supplying liquid, a scope of selection of safety and fuel supply is expanded, and simplification of the system becomes possible, and downsizing of a fuel cell can be realized, and it is advantageous as power sources of portable electronic devices.

Resistance of the membrane electrode assembly prepared can be measured by setting the membrane electrode assembly in a cell of a fuel cell and using a frequency response analyzer 1255B manufactured by Solartron Inc and a potentiostat SI 1287 manufactured by Solartron Inc. An example of measuring conditions is as follows. A current I (mA) having the amplitude of I/10 is applied to the membrane electrode assembly, and characteristics are measured in a frequency range of 50 kHz to 10 mHz to measure impedance. The measured impedance is plotted as a complex plane graph and a size of the resulting circular arc or distorted circular arc is taken as resistance Rr (=right end of X-axis (real axis) intercept—left end of X-axis (real axis) intercept). In this time, the resulting right end of X-axis intercept and left end becomes a right side and a left side points of intersection of a semicircle obtained from the complex plane graph and the X-axis. When the graph is not semicircle, a semicircle is estimated by a circle fit of "ZView Electrochemical Impedance Software" (produced by Scribner Associates, Inc.) based on a Nyquist plot and a right end and a left end of X-axis intercept are used (refer to FIG. 1).

Further, since resistance Rr depends on a current value applied and its amplitude by a large amount, in a measuring method of the present invention, the product I (mA) of a current density value at the time of maximum output and an area of the electrode evaluated in measuring a voltage-current characteristic by following the same procedure as in a paragraph (6) in [Measuring method] described later is applied, and its amplitude is set at I/10. Since resistance Rr thus obtained depends on an interface resistance by a large amount, Rr is a measure showing an effect of the interface resistance reducing composition of the present invention. That is, it is said that if a value of Rr increases, a value of the interface resistance increases, and if a value of Rr decreases, a value of the interface resistance decreases. Further, since there is a tendency that a higher output is obtained when Rr becomes smaller, Rr of the membrane electrode assembly of the present invention is preferably 1.5 $\Omega \cdot cm^2$ or less, more preferably 1.2 $\Omega \cdot cm^2$ or less, and furthermore preferably 1.0 $\Omega \cdot cm^2$ or less. In the membrane electrode assembly of the present invention, particularly, a value of Rr is preferably 1.5 $\Omega \cdot cm^2$ or less when a 3% by weight aqueous solution of methanol is used and a cell temperature is set at 60° C., more preferably 1.2 $\Omega \cdot cm^2$ or less, and furthermore preferably 1.0 $\Omega \cdot cm^2$ or less. The reason for this is that by including such a requirement, an internal resistance of the fuel cell decreases, a voltage drop in increasing a current to be drawn out is small, higher output can be achieved, and the scope of equipment and a device on which a fuel cell is mounted is expanded.

As for an output, a maximum output density in the case, for example, where a cell temperature is set at 60° C., a 3% by weight aqueous solution of methanol is supplied at a rate of 0.5 ml/min to the anode side, and air was supplied at a rate of 50 ml/min to the cathode side is preferably 40 mW/cm$^2$ or more. When the maximum output density is 40 mW/cm$^2$ or more, it is useful because an area of the membrane electrode assembly can be reduced and the scope of equipment which can be driven is expanded. The maximum output density is more preferably 50 mW/cm$^2$ or more, and furthermore preferably 60 mW/cm$^2$ or more.

Further, the voltage retention after generating power at a current density of 100 mA/cm$^2$ for 100 hours is preferably 50% or more, more preferably 60% or more, and furthermore preferably 70% or more. When the current density is higher, it is preferred since the scope of equipment on which a fuel cell is mounted is expanded, and the voltage retention is more preferably 150 mA/cm$^2$ or more, and furthermore preferably 250 mA/cm$^2$ or more. In the membrane electrode assembly of the present invention, particularly, the voltage retention after operating for 100 hours at a constant current of 250 mA/cm$^2$ (hereinafter, an evaluation performed under a condition of an approximately constant current value is referred to as a "constant current evaluation") at 50° C. using a 20% by weight aqueous solution of methanol is preferably 50% or more, more preferably 60% or more, and furthermore preferably 70% or more. The reason for this is that by including such a requirement, when the membrane electrode assembly of the present invention is mounted on equipment as a fuel cell, it becomes possible to use this equipment for the long term. Naturally, in the case of a current density of less 100 mA/cm$^2$, the voltage retention is preferably 50% or more, more preferably 60% or more, and furthermore preferably 70% or more. Further, the above-mentioned output density can also be measured by using, for example, an evaluating apparatus manufactured by TOYO Technica Inc., a potentiostat 1470 manufactured by Solartron Inc., and a frequency response analyzer 1255B manufactured by Solartron Inc.

Further, a methanol permeation rate of the membrane electrode assembly, which is determined by collecting an exhaust gas from a cathode in a bag for gas collecting before applying a current and measuring the concentrations of both methanol in a sampling gas and carbon dioxide produced by oxidation using a gas chromatograph with an auto-sampler manufactured by GL Sciences Inc., is preferably 10 µmol/cm$^2$/min or less when a 3% by weight aqueous solution of methanol is used and a cell temperature is adjusted to 60° C. When the methanol permeation rate is 10 µmol/cm$^2$/min or less, an effect of a fuel crossover on decrease in output is small and it is useful from the viewpoint of extending a time to drive equipment on which a fuel cell is mounted. The methanol permeation rate is more preferably 8 µmol/cm$^2$/min or less, furthermore, and furthermore preferably 5 µmol/cm$^2$/min or less.

Furthermore, in the case of a passive evaluation in which positive fuel supply and temperature control are not performed on both sides of the anode and the cathode, the output density with a 30% by weight aqueous solution of methanol as a fuel is preferably 15 mW/cm$^2$ or more, is more preferably 20 mW/cm$^2$ or more, and furthermore preferably 40 mW/cm$^2$ or more because an area of the membrane electrode assembly can be reduced and the scope of equipment which can be driven is expanded.

As applications of the fuel cell of the present invention, electric power sources for mobile units are preferred. Particularly, the fuel cell of the present invention is preferably used as electric power sources for portable equipment such as cellular phone, personal computer, PDA, video camera (camcorder), digital camera, handy terminal, RFID reader, and various displays; home appliances such as electric shaver and cleaner; power tool, home power supplier; and mobile units such as automobiles, for example, passenger car, bus and truck, two-wheel vehicle, electric bicycles, robot, electric cart, electric wheelchair, and marine vessel and rail car. Particularly in portable equipment, the fuel cell is used not only for a power source but also for charging a secondary battery mounted on the portable equipment, and further it can also be suitably used as a hybrid power source in which a secondary battery or a solar cell is used in combination.

EXAMPLES

Hereinafter, the present invention will be described in more detail by way of examples, but these examples are for the purpose of better understanding the present invention and the present invention is not limited to these examples.

[Measuring Method]

Properties in the examples were measured by the methods described below.

(1) Density of Sulfonic Acid Group

A sample was stirred and cleaned for 24 hours or more in pure water of 25° C., and then dried under a vacuum at 100° C. for 24 hours, and then purified. The dried polymer was analyzed by elementary analysis. C, H, N were analyzed by fully automated elementary analyzer variEL, and S was analyzed by a flask combustion method/barium acetate titration, and P was analyzed by a flask combustion method/a phosphovanado-molybdate calorimetric method. The density of a sulfonic acid group (mmol/g) per unit gram was determined from the composition of each polymer.

(2) Weight Average Molecular Weight

A weight average molecular weight of a polymer was measured by GPC. Measurement were performed at a flow rate of 0.2 ml/min using a N-methyl-2-pyrrolidone (N-methyl-2-pyrrolidone containing 10 mmol/l lithium bromide) as a solvent, HLC-8022 GPC manufactured by TOSOH CORP. as an apparatus combining a ultraviolet detector and a differential refractometer into one, and two TSK gel SuperHM-H (inner diameter 6.0 mm, length 15 cm) produced by TOSOH CORP. as a GPC column, and a weight average molecular weight was determined on the standard polystyrene equivalent basis.

(3) Membrane Thickness

Membrane thickness was measured using ID-C112 manufactured by MITUTOYO CORPORATION set on a granite comparator stand BSG-20 manufactured by MITUTOYO CORPORATION.

(4) Tensile Elastic Modulus

A modulus of tensile mode was measured under the conditions of load cell 5N, range 40%, distance between chucks 3 cm, cross head speed 100 mm/min, and N=5 using TENSILON tester manufactured by ORIENTEC Co., Ltd. A test sample was prepared by immersing a polymer formed in film form in water of 25° C. for 24 hours and then cutting off it into a strap of about 5 cm in length×2 mm in width.

(5) Analysis of Plasticizer in Cleaning Solution of Membrane Assembly

Water used in cleaning was analyzed with a gas chromatograph "5890 series II" manufactured by Hewlett Packard Corp. Measuring conditions are shown below.

Injection temp: 250° C.
Column head press: 20 psi
Carrier gas: He
Injection mode: Split (Line flow 40 ml/min)
Septum purge: He 3.0 ml/min
Injection volume: 2.0 μl
Detector temp: 250° C.
Detector gas: $H_2$ 40 ml/min, Air 400 ml/min, Aux ($N_2$) 40 ml/min Column oven temp Initial: 50° C.
Final: 250° C.
Rate: 20° C./min (6) Resistance of Membrane Electrode Assembly The membrane electrode assembly prepared was set in a cell of a fuel cell (a single cell "EFC05-01SP" manufactured by Electro-Chem-Technic), and resistance R was measured using a frequency response analyzer 1255B manufactured by Solartron Inc and a potentiostat SI 1287 manufactured by Solartron Inc. An example of measuring conditions is as follows. A current I (mA) having the amplitude of I/10 (mA) is applied to the membrane electrode assembly, and characteristics are measured in a frequency range of 50 kHz to 10 mHz to measure impedance. The measured impedance is plotted as a complex plane graph and a size of the resulting circular arc or distorted circular arc is taken as resistance Rr (=right end of X-axis (real axis) intercept—left end of X-axis (real axis) intercept). In this time, the resulting right end of X-axis intercept and left end becomes a right side and a left side points of intersection of a semicircle obtained from the complex plane graph and the X-axis. When the graph is not semicircle, a semicircle is estimated by a circle fit of "ZView Electrochemical Impedance Software" (produced by Scribner Associates, Inc.) based on a Nyquist plot and a right end and a left end of X-axis intercept are used (refer to FIG. 1). An example of the results of impedance measurements of the membrane electrode assembly is shown in FIG. 1. Further, since resistance Rr depends on a current value applied and its amplitude by a large amount, in a measuring method of the present invention, the product I (mA) of a current density value at the time of maximum output and an area of the electrode evaluated in supplying a 3% by weight aqueous solution of methanol (MeOH) at a rate of 0.5 ml/min to the anode side and air at a rate of 50 ml/min to the cathode side, and adjusting a cell temperature to 60° C. to measure a voltage-current characteristic is applied, and its amplitude is set at I/10. Since resistance Rr depends on an interface resistance by a large amount, Rr is a measure showing an effect of the interface resistance reducing composition of the present invention and it is preferably low.

(7) Measurement of Storage Modulus and Loss Modulus

A. Identification of Cross-Section of Membrane Electrode Assembly

A membrane electrode assembly dried at 60° C. for 24 hours under a reduced pressure was cut off with a cutter and embed in an epoxy rein for electron microscope (Quetol 812 produced by Nisshin EM Corporation), and this epoxy resin was cured over 48 hours in an oven of 60° C., and then an ultra thin-section of about 100 nm in thickness was prepared with an utramicrotome (ULTRACUT S manufactured by Leica Microsystems AG).

The prepared ultra thin-section was mounted on a Cu grid of 100 mesh manufactured by Okenshoji Co., Ltd., and TEM observation was performed at an acceleration voltage of 100 kV using a transmission electron microscope H-7100 FA manufactured by Hitachi, Ltd., and the locations of the electrolyte membrane and the layer (A) were identified by the observation of the cross section of the membrane electrode assembly.

B. Measurement by Ultramicro Penetrometer

The above-mentioned ultra thin-section was used as a sample, and modulus mapping images of the electrolyte membrane portion and the layer (A) portion were obtained using an ultramicro penetrometer (Tribo Indenter manufactured by Hysitron Inc.) to determine the storage modulus and the loss modulus. Values of the storage modulus C of the electrolyte membrane, the storage modulus D of the layer (A) and a ratio C/D thereof, and the loss modulus E of the electrolyte membrane, the loss modulus F of the layer (A) and a ratio E/F thereof were determined. Measuring conditions are shown below.

Measuring apparatus: Tribo Indenter manufactured by Hysitron Inc.

Indenter: Cubecorner indenter made of diamond (radius of curvature 50 nm)

Measuring field: about 30 mm square

Measuring frequency: 200 Hz

Measuring atmosphere: room temperature & in the air

Contact load: 0.3 μN (8) Measurement of Phase Difference

A. Identification of Cross Section of Membrane Electrode Assembly

A membrane electrode assembly dried at 60° C. for 24 hours under a reduced pressure was cut off with a cutter and embed in an epoxy rein for electron microscope (Quetol 812 produced by Nisshin EM Corporation), and this epoxy resin was cured over 48 hours in an oven of 60° C., and then an ultra thin-section of about 100 nm in thickness was prepared with an utramicrotome (ULTRACUT S manufactured by Leica Microsystems AG).

The prepared ultra thin-section was mounted on a Cu grid of 100 mesh manufactured by Okenshoji Co., Ltd., and TEM observation was performed at an acceleration voltage of 100 kV using a transmission electron microscope H-7100 FA manufactured by Hitachi, Ltd., and the location of the layer (A) was identified by the observation of the cross section of the membrane electrode assembly.

B Measurement by Scanning Probe Microscope

A cross section sliced by a microtome was ultrasonic-cleaned with ethanol and measuring points of the electrolyte membrane and the layer (A) were determined referring to TEM observation images. The phase difference was measured using a scanning probe microscope (Nanoscope IIIa, Dimension 3000) and a phase detection extender module (PHASE-D01 type), respectively, manufactured by US VEECO INSTRUMENTS INC. A scanning range was set at 12.5 μm×25 μm, and a measuring probe was scanned over the surface of a sample while vibrating the measuring probe at a resonance frequency (tapping mode scanning). In this time, the radius of curvature of a probe tip was 5 to 20 nm, and a tapping frequency was 150 to 450 kHz.

Under the above-mentioned conditions, scanning on tapping mode was performed to measure a phase difference (delay) between an AC signal outputted by tapping mode scanning and an AC signal inputted to vibrate the probe. The phase differences (delay) at every scanning points were measured. A phase difference of the most bright portion of a portion excluding constituents of the membrane electrode assembly in an observation sample, that is, a phase difference of a cured substance of an epoxy resin to be used in preparing an ultra thin-section of the membrane electrode assembly is regarded as 0, and the normalized values of the phase differences of the electrolyte membrane portion and the layer near the electrode, respectively, are regarded as M and I, respectively, to determine the ratio between the phase differences M/I.

(9) Performance Evaluation of Membrane Electrode Assembly

A. Voltage Retention

The membrane electrode assembly was incorporated into a single cell "EFC05-01SP" (a cell for electrode area 5 $cm^2$) manufactured by Electro-Chem-Technic, a cell temperature was adjusted to 50° C., a 20% by weight aqueous solution of methanol was supplied at a rate of 0.5 ml/min to the anode side, synthetic air was supplied at a rate of 50 ml/min to the cathode side, and a voltage-current characteristic was measured using an evaluating apparatus manufactured by TOYO Technica Inc., a potentiostat 1470 manufactured by Solartron Inc. and a frequency response analyzer 1255B manufactured by Solartron Inc. to read a voltage at a current density of 250 $mA/cm^2$. Thereafter, an operation was performed for 100 hours at a constant current of 250 $mA/cm^2$ in a pattern of 5 hour operation-1 hour idling. After a constant current evaluation, a voltage at a current density of 250 $mA/cm^2$ was read from a current-voltage curve to calculate the voltage retention since the initial voltage.

B. Measurement of Fuel (Methanol) Permeation Rate (hereinafter, may be referred to as a "MCO")

A methanol permeation rate of the membrane electrode assembly was determined by collecting synthetic air emitted from a cathode in a bag for gas collecting before applying a current and measuring the concentrations of both methanol in a sampling gas and carbon dioxide produced by oxidation using a gas chromatograph with an auto-sampler "MicroGC CP4900" manufactured by GL Sciences Inc. It was assumed that all of this carbon dioxide is derived from methanol permeated and produced. An air rate of the cathode was regarded as L (ml/min), the total concentration of methanol and carbon dioxide by gas chromatograph was regarded as Z (vol. %) and the total volume was regarded as V (ml), and an opening area (an area which a fuel of an aqueous solution of methanol in the membrane electrode assembly directly contacts) was regarded as A ($cm^2$), and MCO was calculated according to the following equation.

$$MCO(\text{mol}/cm^2/\text{min}) = (L+V) \times (Z/100)/22400/A$$

C. Passive Evaluation

A 30% by weight aqueous solution of methanol was measured in a state of being stored in an anode using an evaluating apparatus manufactured by TOYO Technica Inc., a potentiostat 1470 manufactured by Solartron Inc., and a frequency response analyzer 1255B manufactured by Solartron Inc. A current sweep rate was set at 10 mV/min, and characteristic was measured to the voltage of 30 mV. An output density was defined by dividing the maximum product of the product of a current and a voltage of a current-voltage curve by an electrode area.

(10) Measurement of Viscosity of Interface Resistance Reducing Composition

The viscosity of the interface resistance reducing composition at a temperature of 20 to 100° C. was measured at a shear rate of 35 ($s^{-1}$) using a rotating rheometer (Rheometer RC 20 manufactured by Rheotech Co.).

As a geometry, values obtained by RHEO2000 software were adopted using (attachment for filling a sample) cone & plate.

In the evaluation method of the present invention, the temperature dependency of viscosity change was evaluated by a ratio (Y/X) of the viscosity value X (Pa) at 30° C. and the viscosity value Y (Pa) at 80° C.

[Synthetic Example of Polymer Material Having Ionic Group]

(1) Synthetic Example 1

109.1 g of 4,4'-difluorobenzophenone was reacted at 100° C. for 10 hours in 150 ml of a fuming sulfuric acid (50% $SO_3$). Thereafter, the reactant was charged into a large amount of water little by little, and the resulting mixture was neutralized with NaOH, and to this, 200 g of common salt was added to precipitate a synthetic product. The obtained precipitation was separated by filtration, and recrystallized with an aqueous solution of ethanol to obtain disodium 3,3'-disulfonate-4,4'-difluorobenzophenone (yield 181 grams, yield 86%). Using 6.9 g of potassium carbonate, 14 g of 4,4'-(9H-fluorene-9-ylidene)bisphenol, and 2.6 g of 4,4'-difluorobenzophenone, and 12 g of the foregoing disodium 3,3'-disulfonate-4,4'-difluorobenzophenone, polymerization was performed at 190° C. in N-methyl-2-pyrrolidone. The reactant was purified by re-precipitating with a large amount of water to obtain a polymer A. A density of a sulfonic acid group of a proton substituted membrane of the obtained polymer A was 2.4 mmol/g from elementary analysis and a weight average molecular weight was 240000.

(2) Synthetic Example 2

Using 6.9 g of potassium carbonate, 14 g of 4,4'-dihydroxytetraphenylmethane, and 7 g of 4,4'-difluorobenzophenone, and 5 g of the foregoing disodium 3,3'-disulfonate-4,4'-difluorobenzophenone of Synthetic Example 1, polymerization was performed at 190° C. in N-methyl-2-pyrrolidone. The reactant was purified by re-precipitating with a large amount of water to obtain a polymer B. A density of a sulfonic acid group of a proton substituted membrane of the obtained polymer B was 1.8 mmol/g from elementary analysis and a weight average molecular weight was 180000.

[Production Example of Electrolyte Membrane]

The above-mentioned polymer A was dissolved in N,N-dimethylacetamide to form a coating solution having a solid content of 25%. This coating solution was applied to a glass plate while flowing and spreading it on the glass plate. The coating solution was dried at 70° C. for 30 minutes and further at 100° C. for 1 hour to obtain a film of 72 μm in thickness. Further, the film was heated to 200 to 300° C. over 1 hour in an atmosphere of nitrogen gas, and heat-treated by heating at 300° C. for 10 minutes, and then cooled. This heat-treated film was immersed in 1 N hydrochloric acid for 12 hours or more to be replaced with proton and then it was immersed in an highly excessive amount of pure water for 1 day or more and cleaned well to obtain an electrolyte membrane A. The tensile elastic modulus of the membrane was 1300 MPa.

Moreover, the above-mentioned polymer B was processed similarly to obtain an electrolyte membrane B. The tensile elastic modulus of the electrolyte membrane B was 1310 MPa.

[Production Example of Electrode]

(1) Electrode for Membrane Electrode Assembly Using Aqueous Solution of Methanol as Fuel A carbon cloth consisting of fabric of carbon fiber produced by US Emulsion Technology (E-TEK) Co., Ltd. was subjected to 20% PTFE treatment. Specifically, the carbon cloth was immersed in a water dispersion containing polytetrafluoroethylene (hereinafter, abbreviated as PTFE) in an amount 20% by weight, and taken out, dried and baked. A carbon black dispersion containing PTFE in an amount 20% by weight was applied onto one side of the baked cloth and baked to prepare an electrode base material. Onto this electrode base material, a Pt—Ru supported carbon catalyst "HiSPEC" (registered trademark) 7000 and "HiSPEC" (registered trademark) 6000 produced by Johnson Matthey Inc., and an anode catalyst coating solution consisting of a 20% solution of Nafion (registered trademark) produced by DuPont and n-propanol was applied, and dried to prepare an electrode A. The anode catalyst coating solution was applied to the surface on which the carbon black dispersion had been applied. Further, a coating solution of a cathode catalyst consisting of a Pt supported carbon catalyst TEC10V50E produced by Tanaka Kikinzoku Kogyo K.K. and a solution of "Nafion" (registered trademark) was applied onto the abovementioned electrode base material and dried to prepare an electrode B.

(2) Electrode for Membrane Electrode Assembly Using Hydrogen as Fuel

Catalyst supported carbon (catalyst: Pt, carbon: ValcanXC-72 produced by Cabot CORPORATION, quantity of platinum to be supported: 50% by weight) was added to a solution of "Nafion" (registered trademark) produced by Aldrich Chemical Co. in such a way that a weight ratio of platinum and "Nafion" (registered trademark) is 1:0.5, and the resulting mixture was stirred well to prepare a catalyst-polymer composition. This catalyst-polymer composition was applied to an electrode base material (carbon paper TGP-H-060 produced by Toray Industries, Inc) which had been subjected to a water-repellent treatment (impregnating the electrode base material with PTFE of 20% by weight), and immediately dried to prepare an electrode C.

Example 1

10 g of polymer A as a polymer material having an ionic group, 60 g of N-methyl-2-pyrrolidone as a plasticizer, and 40 g of glycerin were put into a container, and they were stirred until to be homogeneous to form an interface resistance reducing composition A. A value of Y/X representing the temperature dependency of viscosity change of the interface resistance reducing composition A was 0.08. This interface resistance reducing composition A was applied onto each of the foregoing electrode A and electrode B so as to be 3 mg/cm², and heat-treated at 100° C. for 1 minute. These electrodes were cut so as to have an electrode area of 5 cm².

Next, these electrodes with an interface resistance reducing composition A were laminated in such a way that two interface resistance reducing compositions A are opposed to the electrolyte membrane A, and the resulting laminate was hot pressed at 100° C. for 1 minute at a pressure of 5 MPa to obtain an membrane electrode assembly. The pressed membrane electrode assembly was immersed in 50 ml of pure water for 30 minutes to extract and clean a plasticizer remaining in the interface resistance reducing composition A, and incorporated in a cell for power generation to prepare a fuel cell. Further, quantitative analysis of glycerin in the water in which the membrane electrode assembly was immersed was performed to detect 60 μg/cm² of glycerin, and it was confirmed that glycerin as a plasticizer yet remains in the interface resistance reducing composition in the step of combining a membrane and an electrode into one.

Figure 2:
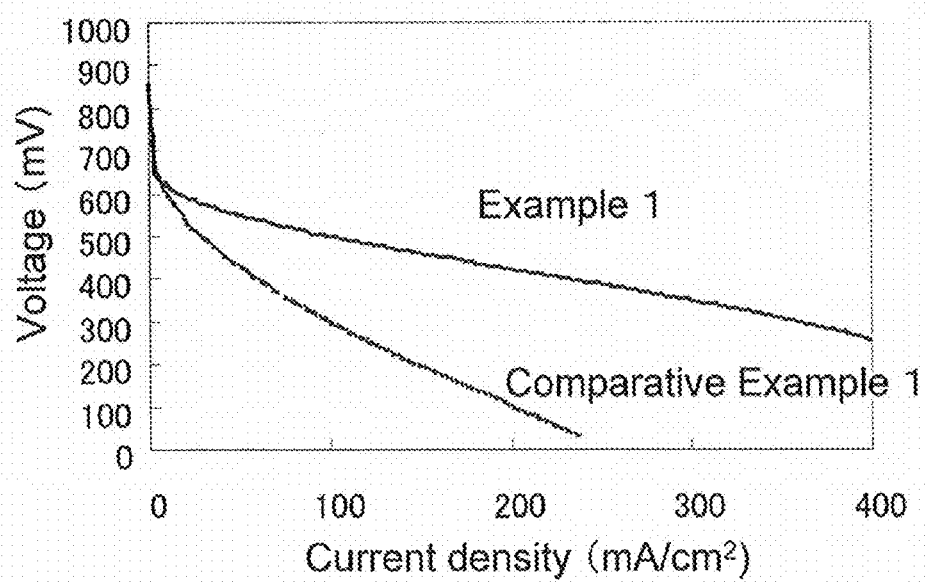
FIG. 2 is a voltage-current characteristic graph of a fuel cell using the membrane electrode assembly of Example 1 and Comparative Example 1 of the present invention.

A 3% by weight aqueous solution of methanol (MeOH) was supplied at a rate of 0.5 ml/min to the anode side and air was supplied at a rate of 50 ml/min to the cathode side to evaluate power generation. Further, a cell temperature was adjusted to 60° C. In this evaluation, a constant current was passed through the membrane electrode assembly, and a voltage at this time was measured. The current was increased in succession and the voltage was measured until the voltage becomes 10 mV or less. The product of the current and the voltage at each measuring point is an output. A voltage-current characteristic of this fuel cell is shown in FIG. 2. And, an Rr value was 0.9 Ω·cm².

A storage modulus, a loss modulus, and a phase difference of a cross section of this membrane electrode assembly were measured, and consequently a layer (A) having a different phase difference from an electrolyte membrane portion could be identified, and the ratio M/I between phase differences of the electrolyte membrane portion and the layer (A) was 0.95, and the electrolyte membrane portion had the storage modulus C of 9.2 GPa and the loss modulus E of 1.4 GPa, and the layer (A) portion had the storage modulus D of 9.2 GPa and the loss modulus F of 1.7 GPa, and C/D=1 and E/F=0.82.

As for the voltage retention of the membrane electrode assembly, a voltage at an initial time was 0.25 V and a voltage after generating a constant current for 100 hours was 0.24 V, and excellent durability of 96% was shown.

Further, a methanol permeation rate of this membrane electrode assembly was 4.5 μmol/cm²/min. And, an output at a passive evaluation exhibited 40 mW/cm².

Comparative Example 1

The electrode A, the electrode B, and the electrolyte membrane A were laminated with the electrolyte membrane A sandwiched between the two electrodes without using the interface resistance reducing composition, and the resulting laminate was hot pressed at 100° C. for 8 minute at a pressure of 5 MPa to obtain an membrane electrode assembly. A voltage-current characteristic of a fuel cell using this membrane electrode assembly is shown in FIG. 2. Further, an Rr value was 2.5 Ω·cm². As is apparent from FIG. 2, Example 1 exhibits a voltage-current characteristic superior to that of Comparative Example 1. Measurements of a storage modulus, a loss modulus, and a phase difference of a cross section of this membrane electrode assembly were tried, but only an electrolyte membrane portion could be observed. A methanol permeation rate of this membrane electrode assembly was 4 μmol/cm²/min, but a voltage retention could not be evaluated. An output at a passive evaluation of this membrane electrode assembly was 5 mW/cm².

Example 2

Figure 8:
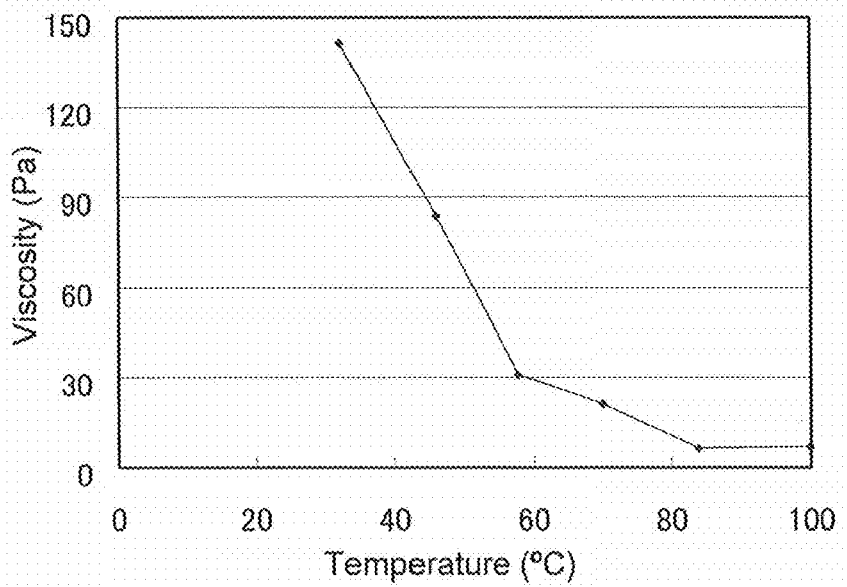
FIG. 8 is a graph showing the temperature dependency of viscosity change of the interface resistance reducing composition B in Example 2.

10 g of polymer A as a polymer material having an ionic group, 40 g of N-methyl-2-pyrrolidone as a plasticizer, and 40 g of glycerin were put into a container, and they were stirred until to be homogeneous to form an interface resistance reducing composition B. The temperature dependency of viscosity of the interface resistance reducing composition B is shown in FIG. 8. A value of Y/X representing the temperature dependency of viscosity change of the interface resistance reducing composition B was 0.05. This interface resistance reducing composition B was applied onto a release base material so as to be 3 mg/cm², and heat-treated at 100° C. for 1 minute to prepare a release sheet with an interface resistance reducing composition. This release sheet with an interface resistance reducing composition was overlaid on each of the electrode A and the electrode B, and the resulting each overlaid one was hot pressed at 100° C. for 1 minute at a pressure of 2 MPa, and each release paper was peeled off to obtain two electrodes with an interface resistance reducing composition.

These electrodes were cut so as to have an electrode area of 5 cm², and a membrane electrode assembly was obtained in the same manner as in Example 1. A fuel cell using this membrane electrode assembly was prepared and evaluated in the same manner as in Example 1, and consequently it was shown that a voltage-current characteristic almost overlaps that of Example 1, and a maximum output was 102 mW/cm². Further, an Rr value was 0.8 Ω·cm². A storage modulus, a loss modulus, and a phase difference of a cross section of this membrane electrode assembly were measured, and consequently a layer (A) having a different phase difference from an electrolyte membrane portion could be identified, and the ratio M/I between phase differences was 0.74, and the electrolyte membrane portion had the storage modulus C of 9.2 GPa and the loss modulus E of 1.47 GPa, and the layer (A) portion had the storage modulus D of 8.8 GPa and the loss modulus F of 1.8 GPa, and C/D=1.04 and E/F=0.82.

As for the voltage retention of the membrane electrode assembly, a voltage at an initial time was 0.26 V and a voltage after generating a constant current for 100 hours was 0.25 V, and excellent durability of 96% was shown.

Moreover, a methanol permeation rate of this membrane electrode assembly was 4.0 μmol/cm²/min. And, an output at a passive evaluation exhibited 39 mW/cm².

Example 3

A release sheet with an interface resistance reducing composition B of Example 2 was prepared. This release sheet with an interface resistance reducing composition B was cut into squares, 2.4 cm on a side, and the cut release sheet was bonded to both sides of the electrolyte membrane A in such a way that the interface resistance reducing composition B come into contact with the electrolyte membrane A and the release sheets on both sides are opposed to each other, and the resulting bonded one was hot pressed at 60° C. for 1 minute at a pressure of 1 MPa, and each release base material was peeled off. Next, the electrode A and the electrode B, respectively having an electrode area of 5 cm², were overlaid on a layer consisting of the interface resistance reducing compositions provided on both sides of the electrolyte membrane, and the resulting overlaid one was hot pressed at 100° C. for 1 minute at a pressure of 2 MPa to obtain an electrode with an interface resistance reducing composition. A fuel cell using this assembly was prepared and evaluated in the same manner as in Example 1, and consequently it was shown that a voltage-current characteristic almost overlaps that of Example 1, and a maximum output was 99 mW/cm². Further, an Rr value was 0.85 Ω·cm². A storage modulus, a loss modulus, and a phase difference of a cross section of this membrane electrode assembly were measured, and consequently a layer (A) having a different phase difference from an electrolyte membrane portion could be identified, and the ratio M/I between phase differences of the electrolyte membrane portion and the layer (A) was 1.11, and the electrolyte membrane portion had the storage modulus C of 7.5 GPa and the loss modulus E of 1.8 GPa, and the layer (A) portion had the storage modulus D of 8.8 GPa and the loss modulus F of 1.7 GPa, and C/D=0.85 and E/F=1.05.

As for the voltage retention of the membrane electrode assembly, a voltage at an initial time was 0.26 V and a voltage after generating a constant current for 100 hours was 0.25 V, and excellent durability of 96% was shown.

Further, a methanol permeation rate of this membrane electrode assembly was 5.4 μmol/cm²/min. And, an output at a passive evaluation exhibited 42 mW/cm².

Example 4

A release sheet with an interface resistance reducing composition B was prepared as with Example 2. This release sheet with an interface resistance reducing composition B was overlaid on each of the electrode A and the electrode B and hot pressed at 100° C. for 1 minute at a pressure of 2 MPa, and each release paper was peeled off to obtain two electrodes with an interface resistance reducing composition B. These electrodes were cut so as to have an electrode area of 5 cm$^2$, and the cut electrode was immersed in a 20% aqueous solution of methanol for 5 hours and then cleaned with pure water to extract and remove a plasticizer and a solvent in the interface resistance reducing composition B. Next, the electrolyte membrane A was sandwiched between these electrodes, and hot pressed at 130° C. for 1 minute at a pressure of 5 MPa to obtain a membrane electrode assembly. A fuel cell using this membrane electrode assembly was prepared and evaluated in the same manner as in Example 1, and consequently it was shown that a voltage-current characteristic almost overlaps that of Example 1, and a maximum output was 105 mW/cm$^2$. Further, an Rr value was 0.79 Ω·cm$^2$. A storage modulus, a loss modulus, and a phase difference of a cross section of this membrane electrode assembly were measured, and consequently a layer (A) having a different phase difference from an electrolyte membrane portion could be identified, and the ratio M/I between phase differences of the electrolyte membrane portion and the layer (A) was 0.95, and the electrolyte membrane portion had the storage modulus C of 9.2 GPa and the loss modulus E of 1.47 GPa, and the layer (A) portion had the storage modulus D of 8.8 GPa and the loss modulus F of 1.8 GPa, and C/D=1.04 and E/F=0.82.

As for the voltage retention of the membrane electrode assembly, a voltage at an initial time was 0.27 V and a voltage after generating a constant current for 100 hours was 0.25 V, and excellent durability of 93% was shown.

Moreover, a methanol permeation rate of this membrane electrode assembly was 4.0 μmol/cm$^2$/min. Furthermore, an output at a passive evaluation exhibited 43 mW/cm$^2$.

Comparative Example 2

A commercially available solution of Nafion (registered trademark) (a reagent produced by Aldrich Chemical Co.) was applied onto the electrode A and the electrode B and dried at 100° C. to obtain electrodes with a coat of Nafion (registered trademark). A value of Y/X representing the temperature dependency of viscosity change of the solution of Nafion (registered trademark) was 0.5, and the solution of Nafion (registered trademark) had a defective coating property since it penetrated into the electrode. Using "Nafion 117 (registered trademark)" produced by Du Pont Kabushiki Kaisha as an electrolyte membrane, the above-mentioned electrodes were laminated with the electrolyte membrane sandwiched between the above-mentioned electrodes without using the interface resistance reducing composition, and the resulting laminate was hot pressed at 100° C. for 30 minute at a pressure of 5 MPa to obtain a membrane electrode assembly.

An Rr value of this membrane electrode assembly was 0.8 Ω·cm$^2$. A storage modulus, a loss modulus, and a phase difference of a cross section of this membrane electrode assembly were measured, and consequently a layer (A) having a different phase difference from an electrolyte membrane portion could be identified, and the ratio M/I between phase differences of the electrolyte membrane portion and the layer (A) was 0.99, and the electrolyte membrane portion had the storage modulus C of 0.8 GPa and the loss modulus E of 0.06 GPa, and the layer (A) portion had the storage modulus D of 0.7 GPa and the loss modulus F of 0.05 GPa, and C/D=1.14 and E/F=1.2. However, since the electrolyte membrane and the layer (A) were a polymer material not containing aromatic hydrocarbon having an anionic group on the main chain, a methanol permeation rate of the membrane electrode assembly was large and 13.0 μmol/cm$^2$/min, and as for the voltage retention, a voltage at an initial time was 0.21 V and a voltage after generating a constant current for 100 hours was 0.1 V, and durability was as low as 48%. And, an output at a passive evaluation exhibited 10 mW/cm$^2$ and was a low output. The cell after these evaluations was knocked down, and the membrane electrode assembly was taken out and observed visually. Consequently, it was found that peeling occurred at the interface between the electrode and the electrolyte membrane due to swelling of an aqueous solution of methanol and a part of the catalyst collapsed and flowed away.

Comparative Example 3

10 g of polymer A as a polymer material having an ionic group, 60 g of N-methyl-2-pyrrolidone as a plasticizer and 40 g of glycerin were put into a container, and they were stirred until to be homogeneous to form an interface resistance reducing composition A. This composition A was applied onto the foregoing electrode A and electrode B so as to be 3 mg/cm$^2$, and heat-treated at 100° C. for 1 minute. These electrodes were cut so as to have an electrode area of 5 cm$^2$.

Next, using "Nafion 117 (registered trademark)" produced by Du Pont Kabushiki Kaisha as an electrolyte membrane, these electrodes with an interface resistance reducing composition A were laminated in such a way that two interface resistance reducing compositions A are opposed to the electrolyte membrane A, and the resulting laminate was hot pressed at 100° C. for 5 minute at a pressure of 5 MPa to obtain an membrane electrode assembly. The pressed membrane electrode assembly was immersed in 50 ml of pure water for 30 minutes to extract and clean a plasticizer remaining in the interface resistance reducing composition A, and incorporated in a cell for power generation to prepare a fuel cell. An Rr value of this membrane electrode assembly was 0.9 Ω·cm$^2$. And, a storage modulus, a loss modulus, and a phase difference of a cross-section of the membrane electrode assembly were measured, and consequently a layer (A) having a different phase difference from an electrolyte membrane portion could be identified, and the ratio M/I between phase differences of the electrolyte membrane portion and the layer (A) was 12.8, and the electrolyte membrane portion had the storage modulus C of 0.8 GPa and the loss modulus E of 0.06 GPa, and the layer (A) portion had the storage modulus D of 9.2 GPa and the loss modulus F of 1.7 GPa, and C/D=0.09 and E/F=0.04. Since in this membrane electrode assembly, the storage modulus C of the electrolyte membrane was smaller than 4 GPa, penetration of an aqueous solution of methanol was high, a methanol permeation rate was large and 14 μmol/cm$^2$/min, and an effect of suppressing methanol is low. As for the voltage retention of the membrane electrode assembly, a voltage at an initial time was 0.17 V and a voltage after generating a constant current for 100 hours was 0.08 V, and durability was as low as 47%. And, an output at a passive evaluation exhibited 8 mW/cm$^2$ and was a low output. The cell after these evaluations was knocked down, and the membrane electrode assembly was taken out and observed visually. Consequently, it was found that peeling, the cause of which is supposedly the difference between dimensional changes of the respective constituent materials due to swelling of an aqueous solution of methanol, occurred at the interface between the electrode and the electrolyte membrane.

Example 5

A membrane electrode assembly was obtained by following the same procedure as in Example 1 except for using the foregoing two electrodes C as an electrode. This membrane electrode assembly was subjected to extraction and cleaning of a plasticizer as with Example 1, and then it was set in a cell to prepare a fuel cell. On this fuel cell, a current-voltage (I-V) characteristic was measured at a cell temperature of 60° C. at a gas utilizing ratio of 70% for an anode and 40% for a cathode using hydrogen as a fuel gas and air as an oxidizing gas, and consequently it was shown that a maximum output was 600 mW/cm$^2$ and a limit current density was 1500 mA/cm$^2$.

In addition, the limit current density will be described. Generally, an electrode reaction comprises many continuous processes such as adsorption, dissociation, and charge transfer of reactants at a field of the reaction, and moves of reactants and products near the field, but a rate in each process increases when a degree of deviation (hereinafter, a degree of non-equilibrium) from a state of equilibrium (a state in which a current is 0) of the process is large, and a relationship between the degree of non-equilibrium and the level of the rate varies from process to process. When a current flows constantly, since rates of all processes are similar, a degree of non-equilibrium of a process proceeding readily is small, but a degree of non-equilibrium of a process not proceeding readily is large. Here, if the current density or the rate of a electrode reaction is increased, particularly, a degree of non-equilibrium of a process not proceeding readily becomes very large and reaches a physical limit. That is, it becomes impossible to use a current density above this limit, and this current density is a limit current density at this point.

Comparative Example 4

Two electrodes C were laminated with the electrolyte membrane A sandwiched between two electrodes C without using the interface resistance reducing composition, and the resulting laminate was hot pressed at 100° C. for 8 minute at a pressure of 5 MPa to obtain a membrane electrode assembly. This membrane electrode assembly was set in a cell to evaluate a fuel cell as with Example 4.

A maximum output was 200 mW/cm$^2$ and a limit current density was 700 mA/cm$^2$, and the performance is lower than that of Example 4.

Example 6

Electrolyte membranes having various tensile elastic moduli were prepared by using 4,4'-(9H-fluorene-9-ylidene) bisphenol, and 4,4'-difluorobenzophenone, and disodium 3,3'-disulfonate-4,4'-difluorobenzophenone in Synthetic example of polymer material having ionic group and changing ratio of these compounds. These electrolyte membranes were formed so as to have a thickness of 75±3 μm, and combined with the electrode A and the electrode B sandwiching the interface resistance reducing composition B between the electrolyte membranes and the electrode A or the electrode B by the same method as in Example 2 to prepare a membrane electrode assembly. Together with this, a membrane electrode assembly not using the interface resistance reducing composition B was prepared, and fuel cells using these membrane electrode assemblies were prepared and evaluated in the same manner as in Example 1. A relationship between a ratio of maximum outputs of both fuel cells (output of a fuel cell using the interface resistance reducing composition/output of a fuel cell not using the interface resistance reducing composition) and the tensile elastic modulus was shown in FIG. 3.

Figure 3:
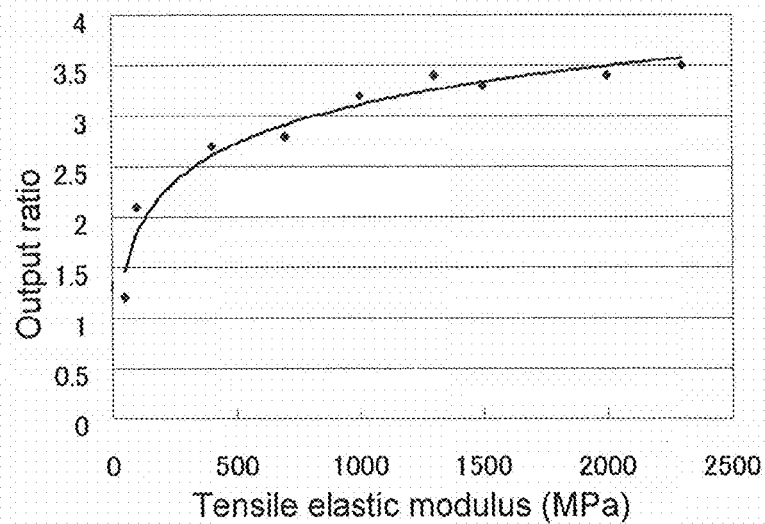
FIG. 3 is a view showing a relationship between the tensile elastic modulus of the electrolyte membrane used in the membrane electrode assembly and the ratio of output of a fuel cell using the interface resistance reducing composition to output of a fuel cell not using the interface resistance reducing composition in the production of the membrane electrode assembly.

As is apparent from FIG. 3, the membrane electrode assemblies produced sandwiching the interface resistance reducing composition have larger maximum output than the membrane electrode assemblies not using the interface resistance reducing composition in the rage of all tensile elastic moduli, and the effect of enhancing the maximum output becomes outstanding especially in the range of the tensile elastic modulus of 100 MPa or more.

Example 7

A membrane electrode assembly was prepared by following the same procedure as in Example 3 except for changing the electrolyte membrane A of Example 3 to the electrolyte membrane B.

A storage modulus, a loss modulus, and a phase difference of a cross section of this membrane electrode assembly were measured, and consequently a layer (A) having a different phase difference from an electrolyte membrane portion could be identified, and the ratio M/I between phase differences of the electrolyte membrane portion and the layer (A) was 1.31, and the electrolyte membrane portion had the storage modulus C of 9.5 GPa and the loss modulus E of 1.8 GPa, and the layer (A) portion had the storage modulus D of 8.8 GPa and the loss modulus F of 1.7 GPa, and C/D=1.08 and E/F=1.06.

As for the voltage retention of the membrane electrode assembly, a voltage at an initial time was 0.26 V and a voltage after generating a constant current for 100 hours was 0.25 V, and excellent durability of 96% was shown.

Further, a methanol permeation rate of this membrane electrode assembly was 5.4 μmol/cm$^2$/min. And, an output at a passive evaluation exhibited 42 mW/cm$^2$. Furthermore, a methanol permeation rate of this membrane electrode assembly was 3.8 μmol/cm$^2$/min. Moreover, an output at a passive evaluation exhibited 35 mW/cm$^2$.

Example 8

10 g of polymer B as a polymer material having aromatic hydrocarbon having an anionic group, 50 g of N-methyl-2-pyrrolidone as a plasticizer, and 40 g of glycerin were put into a container, and they were stirred until to be homogeneous to form an interface resistance reducing composition. This composition was applied onto the foregoing electrode A and electrode B so as to be 4 mg/cm$^2$, and heat-treated at 100° C. for 1 minute. These electrodes were cut so as to have an electrode area of 5 cm$^2$.

Next, these electrodes with an interface resistance reducing composition were laminated in such a way that two interface resistance reducing compositions are opposed to the electrolyte membrane B, and the resulting laminate was hot pressed at 100° C. for 1 minute at a pressure of 5 MPa, and the pressed membrane electrode assembly was immersed in 50 ml of pure water for 30 minutes to extract and clean a plasticizer remaining in the interface resistance reducing composition to prepare an membrane electrode assembly.

A storage modulus, a loss modulus, and a phase difference of a cross section of this membrane electrode assembly were measured, and consequently a layer (A) having a different phase difference from an electrolyte membrane portion could be identified, and the ratio M/I between phase differences of the electrolyte membrane portion and the layer (A) was 0.95, and the electrolyte membrane portion had the storage modulus C of 9.5 GPa and the loss modulus E of 1.9 GPa, and the layer (A) portion had the storage modulus D of 8.8 GPa and the loss modulus F of 1.7 GPa, and C/D=1.07 and E/F=1.12.

As for the voltage retention of the membrane electrode assembly, a voltage at an initial time was 0.23 V and a voltage after generating a constant current for 100 hours was 0.22 V, and excellent durability of 96% was shown.

Further, a methanol permeation rate of this membrane electrode assembly was 5.9 µmol/cm$^2$/min. Furthermore, an output at a passive evaluation exhibited 37 mW/cm$^2$.

Example 9

10 g of polymer A as a polymer material having aromatic hydrocarbon having an anionic group, 50 g of N-methyl-2-pyrrolidone as a plasticizer, and 40 g of glycerin were put into a container, and they were stirred until to be homogeneous to form an interface resistance reducing composition. This composition was applied onto the foregoing electrode A and electrode B so as to be 3 mg/cm$^2$, and heat-treated at 100° C. for 1 minute. These electrodes were cut so as to have an electrode area of 5 cm$^2$.

Next, these electrodes with an interface resistance reducing composition were laminated in such a way that two interface resistance reducing compositions are opposed to the electrolyte membrane A, and the resulting laminate was hot pressed at 100° C. for 1 minute at a pressure of 5 MPa to obtain a membrane electrode assembly. The pressed membrane electrode assembly was immersed in 50 ml of pure water for 30 minutes to extract and clean a plasticizer remaining in the interface resistance reducing composition to obtain a membrane electrode assembly.

A storage modulus, a loss modulus, and a phase difference of a cross section of this membrane electrode assembly were measured, and consequently a layer (A) having a different phase difference from an electrolyte membrane portion could be identified, and the ratio M/I between phase differences of the electrolyte membrane portion and the layer (A) was 0.95, and the electrolyte membrane portion had the storage modulus C of 9.5 GPa and the loss modulus E of 1.9 GPa, and the layer (A) portion had the storage modulus D of 8.8 GPa and the loss modulus F of 1.7 GPa, and C/D=1.07 and E/F=1.12.

As for the voltage retention of the membrane electrode assembly, a voltage at an initial time was 0.25 V and a voltage after generating a constant current for 100 hours was 0.24 V, and excellent durability of 96% was shown.

Further, a methanol permeation rate of this membrane electrode assembly was 5.0 µmol/cm$^2$/min. Furthermore, an output at a passive evaluation exhibited 42 mW/cm$^2$.

INDUSTRIAL APPLICABILITY

The method of producing a membrane electrode assembly of the present invention is applicable to the production of membrane electrode assemblies of various electrochemical apparatus (for example, a fuel cell, an electrolysis apparatus of water, an electrolysis apparatus of chloroalkali, etc.). The method of producing a membrane electrode assembly of the present invention is suitable for a fuel cell among these apparatus and suitable particularly for a fuel cell using hydrogen or an aqueous solution of methanol as a fuel.

In addition, the membrane electrode assembly of the present invention is applicable to the membrane electrode assemblies of various electrochemical apparatus (for example, a fuel cell, an electrolysis apparatus of water, an electrolysis apparatus of chloroalkali, etc.). It is suitable for a fuel cell among these apparatus and suitable particularly for a fuel cell using hydrogen or an aqueous solution of methanol as a fuel.

Applications of the fuel cell of the present invention are not particularly limited, but the fuel cell of the present invention is preferably used as electric power sources for portable equipment such as cellular phone, personal computer, PDA, video camera, digital camera, portable TV, digital audio player and hard disk player; home appliances such as cordless cleaner; mobile units such as toys, vehicles, for example, electric bicycles, electric wheelchair, two-wheel vehicle, passenger car, bus and truck, and marine vessel and rail car; power sources of robot and cyborg; alternatives of conventional primary and secondary battery such as stationary generator; and hybrid power sources in which a secondary battery or a solar cell is used in combination, or for charging a battery.

The invention claimed is:

1. A method of producing a membrane electrode assembly formed by sandwiching an electrolyte membrane between a pair of electrodes, comprising the steps of bonding at least one electrode to the electrolyte membrane sandwiching an interface resistance reducing composition containing a polymer material having an ionic group and a plasticizer between the electrode and the electrolyte membrane, and removing a part of or all of the plasticizer from said interface resistance reducing composition by extraction by a solvent.

2. The method of producing a membrane electrode assembly according to claim 1, comprising the steps of providing said interface resistance reducing composition on the electrolyte membrane and/or providing said interface resistance reducing composition on the electrode, and then comprising any one of the following steps (1) to (3):
  (1) bonding the electrolyte membrane provided with the interface resistance reducing composition to the electrode,
  (2) bonding the electrode provided with an interface resistance reducing composition to the electrolyte membrane, and
  (3) bonding the electrolyte membrane provided with the interface resistance reducing composition to the electrode provided with an interface resistance reducing composition to the electrolyte membrane.

3. The method of producing a membrane electrode assembly according to claim 1, comprising the step of removing a part of or all of the plasticizer from said interface resistance reducing composition after the step of bonding the electrode to the electrolyte membrane.

4. The method of producing a membrane electrode assembly according to claim 1, comprising the step of providing the interface resistance reducing composition on the electrode and removing a part of the plasticizer from said interface resistance reducing composition before the step of bonding the electrode to the electrolyte membrane.

5. The method of producing a membrane electrode assembly according to claim 1, wherein said plasticizer is water-soluble.

6. The method of producing a membrane electrode assembly according to claim 1, wherein said interface resistance reducing composition formed by containing polymer electrolyte having an aromatic ring on the main chain.

7. A membrane electrode assembly formed by sandwiching an electrolyte membrane between a pair of electrodes, wherein the membrane electrode assembly has a layer (A) at least between one electrode and the electrolyte membrane, and the value of the storage modulus C is 1 GPa or more when the storage modulus of the electrolyte membrane, which is measured with an ultramicro pentrometer, is regarded as C, and wherein the value of either the loss modulus E or the loss modulus F is 0.1 GPa or more when the loss modulus of the electrolyte membrane is regarded as E and the loss modulus of the layer (A) is regarded as F.

8. The membrane electrode assembly according to claim 7, wherein the value of at least either C/D or E/F is between 0.5 to 1.5 when the storage modulus of the layer (A) is regarded as D.

9. The membrane electrode assembly according to claim 7, wherein a material composing said electrolyte membrane or said layer (A) contains polyetheretherketone or polyetherketone.

10. The membrane electrode assembly according to claim 7, wherein materials composing the electrolyte membrane and the layer (A) are substantially the same.

11. The membrane electrode assembly according to claim 7, comprising at least one requirement selected from the following requirements (1) to (4):
  (1) a value of Rr is 1.5 $\Omega \cdot cm^2$ or less when a 3% by weight aqueous solution of method is used and a cell temperature is set at 60° C.,
  (2) a methanol permeation rate is 10 μmol/$cm^2$/min or less when a 3% by weight aqueous solution of methanol is used and a cell temperature is set to 60° C.,
  (3) a voltage retention after operating for 100 hours at a constant current of 250 mA/$cm^2$ at 50° C. using a 20% by weight aqueous solution of methanol is 50% or more.
  (4) an output density at a passive evaluation is 15 mW/$cm^2$ or more.

12. A fuel cell using the membrane electrode assembly according to claim 7.

13. A membrane electrode assembly formed by sandwiching an electrolyte membrane between a pair of electrodes, wherein the membrane electrode assembly has a layer (A) having a substantially different phase difference, which is measured by scanning on a tapping mode of a scanning probe microscope, said layer (A) at least between one electrode and the electrolyte membrane, and the electrolyte membrane and the layer (A) contain aromatic hydrocarbon having an anionic group on the main chain.

14. The membrane electrode assembly according to claim 13, wherein the ratio (M/I) between a phase difference (M) of the electrolyte membrane and a phase difference (I) of the layer (A) is 0.1 to 10 (excluding the case of M/I=1).

15. A fuel cell using the membrane electrode assembly according to claim 13.

* * * * *